US012712856B2

(12) United States Patent
Kakaiya

(10) Patent No.: US 12,712,856 B2
(45) Date of Patent: Aug. 18, 2026

(54) TECHNIQUES FOR A TRUSTED EXECUTION ENVIRONMENT AT A COMPUTE SERVER TO USE A REMOTE ACCELERATOR

(71) Applicant: Intel Corporation, Santa Clara, CA (US)

(72) Inventor: Utkarsh Y. Kakaiya, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/942,466

(22) Filed: Sep. 12, 2022

(65) Prior Publication Data

US 2024/0089239 A1 Mar. 14, 2024

(51) Int. Cl.

*H04L 29/06* (2006.01)
*G06F 21/53* (2013.01)
*H04L 9/32* (2006.01)
*H04L 9/40* (2022.01)

(52) U.S. Cl.

CPC .......... *H04L 63/0428* (2013.01); *G06F 21/53* (2013.01); *H04L 9/3242* (2013.01); *G06F 2221/034* (2013.01)

(58) Field of Classification Search

CPC ... H04L 63/0428; H04L 63/20; H04L 9/3242; H04L 63/10; H04L 63/0263; G06F 21/53
See application file for complete search history.

(56) References Cited

U.S. PATENT DOCUMENTS 9,076,021 B2 * 7/2015 Pittelko ............... H04L 63/0428
10,243,746 B2 3/2019 Tsirkin et al.
2013/0297901 A1 11/2013 Nakada et al.
2019/0004978 A1 1/2019 Mevergnies et al.
2019/0228145 A1 7/2019 Shanbhogue et al.
2020/0145419 A1 * 5/2020 Yitbarek ............. H04L 63/0853
2021/0141658 A1 5/2021 Sahita et al.
2022/0012088 A1 1/2022 Bernat et al.
2023/0098288 A1 3/2023 Shanbhogue et al.

FOREIGN PATENT DOCUMENTS

CN 10-794-7981 A * 4/2018
WO 2020180464 A1 9/2020

OTHER PUBLICATIONS

Intel White Paper, "Intel® Trust Domain Extensions", Feb. 2022, 9 pages.
Intel, "Architecture Specification: Intel® Trust Domain Extensions (Intel® TDX) Module", Sep. 2020, 285 pages.

* cited by examiner

*Primary Examiner* — Longbit Chai
(74) *Attorney, Agent, or Firm* — Nicholson De Vos Webster & Elliott LLP

(57) ABSTRACT

Examples include techniques for a trusted execution environment (TEE) at a compute server to request a service to be performed by an accelerator that is located at or with a service server. Examples are described of the TEE at the compute server authenticating the remote accelerator to enable establishment of one or more secure communication sessions for the accelerator to decrypt encrypted data, perform a transformation on the decrypted data and then re-encrypt the transformed data. Examples are also described of the TEE at the compute server authenticating a service TEE at the service server as well as the accelerator to enable the service TEE and the accelerator to collaboratively decrypt encrypted data, perform a transformation on the decrypted data and then re-encrypt the transformed data.

31 Claims, 24 Drawing Sheets

KEY TABLE 400

| Valid/Present Bit | Session Key Info. |
|---|---|
| 0/1 | Key Material 410-0 |
| 0/1 | Key Material 410-1 |
| 0/1 | Key Material 410-2 |
| . | . |
| . | . |
| . | . |
| 0/1 | Key Material 410-N |

KEY TABLE 400

| Valid/Present Bit | Session Key Info. |
|---|---|
| 0/1 | Key Material 410-0 |
| 0/1 | Key Material 410-1 |
| 0/1 | Key Material 410-2 |
| . | . |
| . | . |
| . | . |
| 0/1 | Key Material 410-N |

*FIG. 4*

KEY TABLE 600

| Valid/Present Bit | Wrapping Key Info. |
| --- | --- |
| 0/1 | Key Material 610-0 |
| 0/1 | Key Material 610-1 |
| 0/1 | Key Material 610-2 |
| . | . |
| . | . |
| . | . |
| 0/1 | Key Material 610-N |

*FIG. 6*

Accelerator Write Integrity Scheme 1100

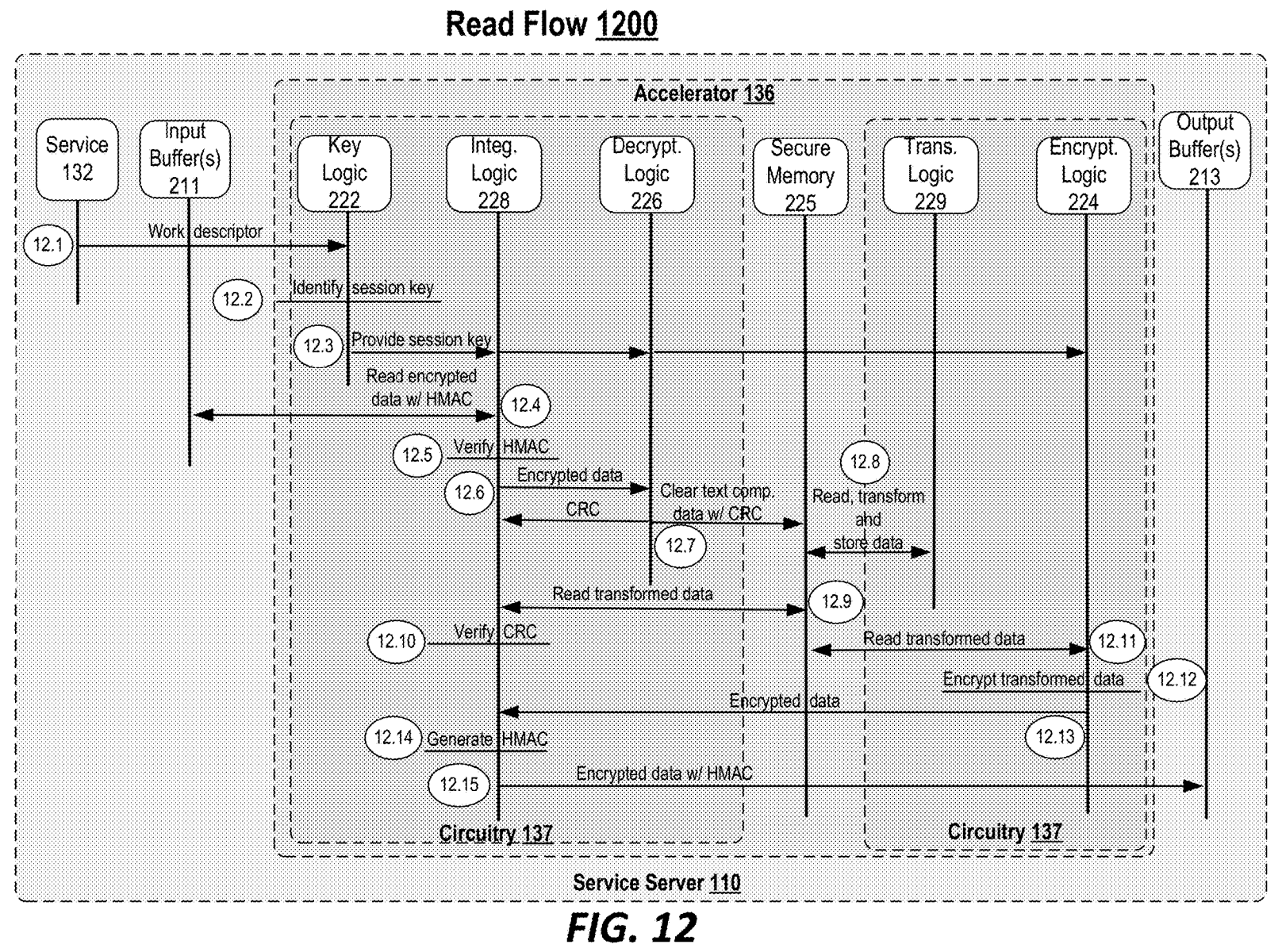

Read Flow 1200

Service Server 110

Accelerator 136

Circuitry 137

Circuitry 137

Service 132

Input Buffer(s) 211

Key Logic 222

Integ. Logic 228

Decrypt. Logic 226

Secure Memory 225

Trans. Logic 229

Encrypt. Logic 224

Output Buffer(s) 213

12.1 Work descriptor 12.2 Identify session key 12.3 Provide session key 12.4 Read encrypted data w/ HMAC 12.5 Verify HMAC 12.6 Encrypted data CRC 12.7 Clear text comp. data w/ CRC 12.8 Read, transform and store data 12.9 Read transformed data 12.10 Verify CRC 12.11 Read transformed data 12.12 Encrypt transformed data 12.13 Encrypted data 12.14 Generate HMAC 12.15 Encrypted data w/ HMAC

FIG. 12

Accelerator Read Integrity Scheme 1300

Storage Write Flow Integrity Scheme 1410
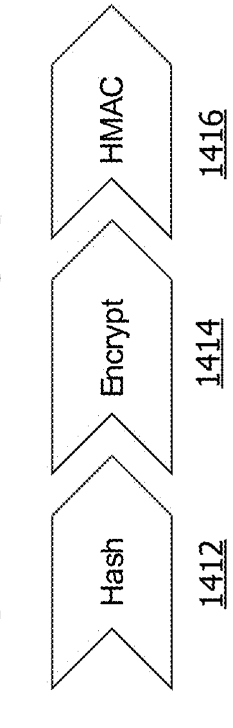
Storage Read Flow Integrity Scheme 1420
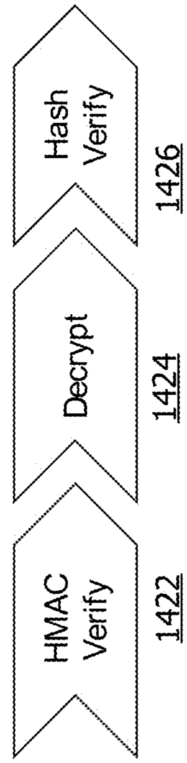
FIG. 14

Storage Service Read Flow Integrity Scheme 1800

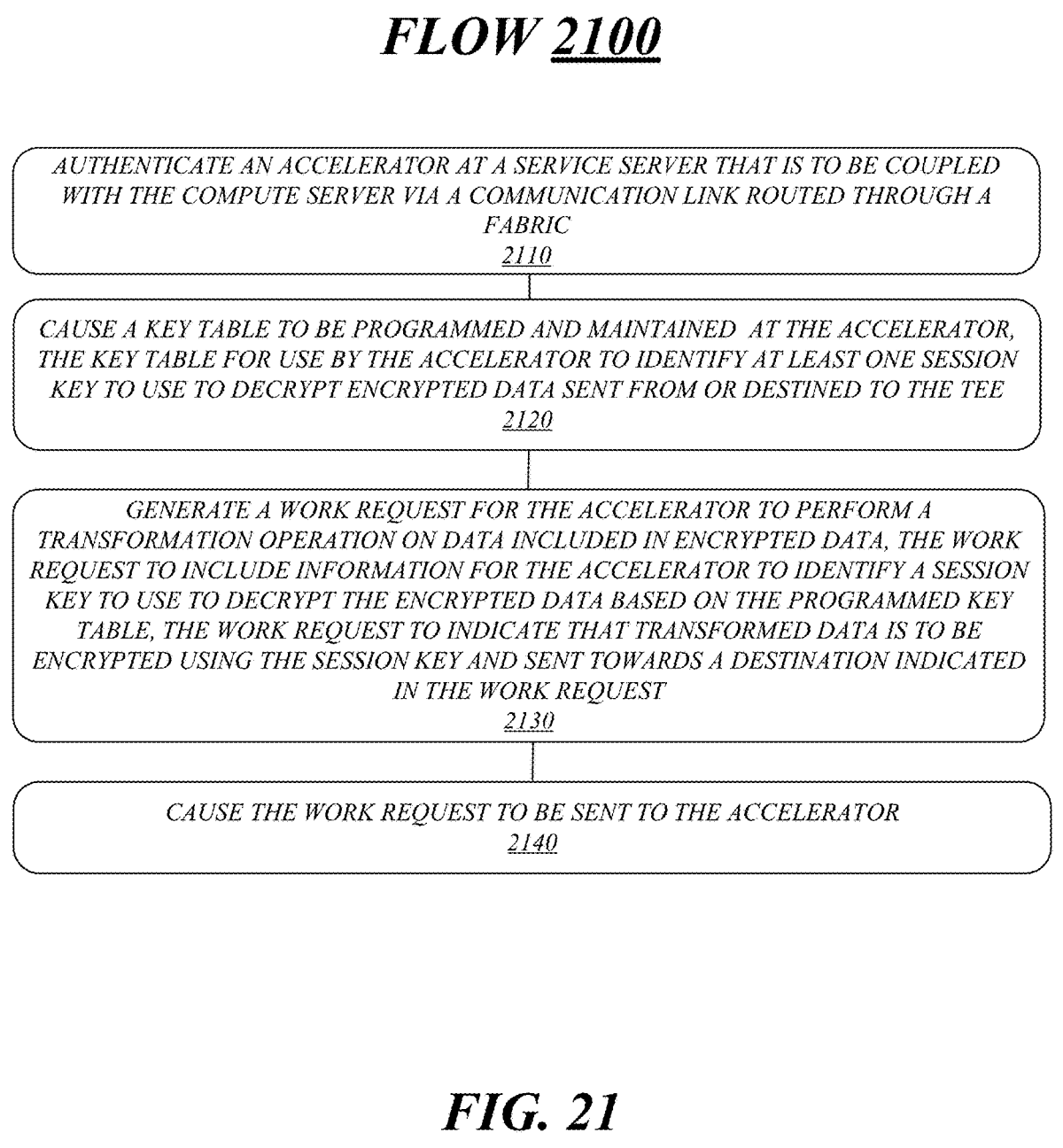

FLOW 2100

AUTHENTICATE AN ACCELERATOR AT A SERVICE SERVER THAT IS TO BE COUPLED WITH THE COMPUTE SERVER VIA A COMMUNICATION LINK ROUTED THROUGH A FABRIC
2110

CAUSE A KEY TABLE TO BE PROGRAMMED AND MAINTAINED AT THE ACCELERATOR, THE KEY TABLE FOR USE BY THE ACCELERATOR TO IDENTIFY AT LEAST ONE SESSION KEY TO USE TO DECRYPT ENCRYPTED DATA SENT FROM OR DESTINED TO THE TEE
2120

GENERATE A WORK REQUEST FOR THE ACCELERATOR TO PERFORM A TRANSFORMATION OPERATION ON DATA INCLUDED IN ENCRYPTED DATA, THE WORK REQUEST TO INCLUDE INFORMATION FOR THE ACCELERATOR TO IDENTIFY A SESSION KEY TO USE TO DECRYPT THE ENCRYPTED DATA BASED ON THE PROGRAMMED KEY TABLE, THE WORK REQUEST TO INDICATE THAT TRANSFORMED DATA IS TO BE ENCRYPTED USING THE SESSION KEY AND SENT TOWARDS A DESTINATION INDICATED IN THE WORK REQUEST
2130

CAUSE THE WORK REQUEST TO BE SENT TO THE ACCELERATOR
2140

FIG. 21

*Storage Medium 2200*

*Computer Executable Instructions for 2100*

TECHNIQUES FOR A TRUSTED EXECUTION ENVIRONMENT AT A COMPUTE SERVER TO USE A REMOTE ACCELERATOR

TECHNICAL FIELD

Examples described herein are generally related to techniques associated with implementing a confidential service requested by a trusted execution environment at a compute server to a remote accelerator coupled with and/or located at a service server.

BACKGROUND

A typical datacenter topology includes numerous compute servers and service servers such as storage service servers. Compute servers can be configured to support or run tenant virtual machines (VMs), and the storage service servers can support or run one or more services that enable storage data access to one or more storage devices for the tenant VMs. In some examples, tenant VMs can be legacy/regular VMs that are not configured to operate within trusted execution environments (TEEs). In other examples, at least a portion of tenant VMs can be configured to operate in a given TEE that is run on a compute server with a reduced trusted computing base (TCB) that includes a limited set of hardware, firmware, and/or software to maintain confidentiality or security. A TCB for these tenant VMs can result in anything outside of the given TEE's TCB as being deemed as not trusted. Not trusted entities on or off a compute server running the given TEE are prevented from having access to confidential data managed inside the given TEE.

In some examples, a TEE can be a TEE VM (TVM) as described by an instruction set architecture (ISA) extension such as Intel® trust domain extensions (Intel® TDX), which describes use of architectural elements to deploy TVMs that are referred to as trust domains (TDs). In other examples, a TEE can be established based on an Intel® software guard extension (SGX) application. In other examples, a TEE can be established based on AMD® Secure Encrypted Virtualization (e.g., SEV/SEV-ES/SEV-SNP) encrypted VM. In other examples, a TEE can be established based on ARM® TrustZone technology.

BRIEF DESCRIPTION OF THE DRAWINGS

FIG. 4 illustrates an example key table to maintain session keys.

FIG. 6 illustrates an example key table to maintain wrapping keys.

FIG. 12 illustrates an example read flow at the accelerator.

FIG. 14 illustrates an example storage write integrity scheme and an example storage read integrity scheme.

FIG. 21 illustrates an example first logic flow.

FIG. 22 illustrates an example first storage medium.

FIG. 24 illustrates an example second storage medium.

DETAILED DESCRIPTION

Figure 1:
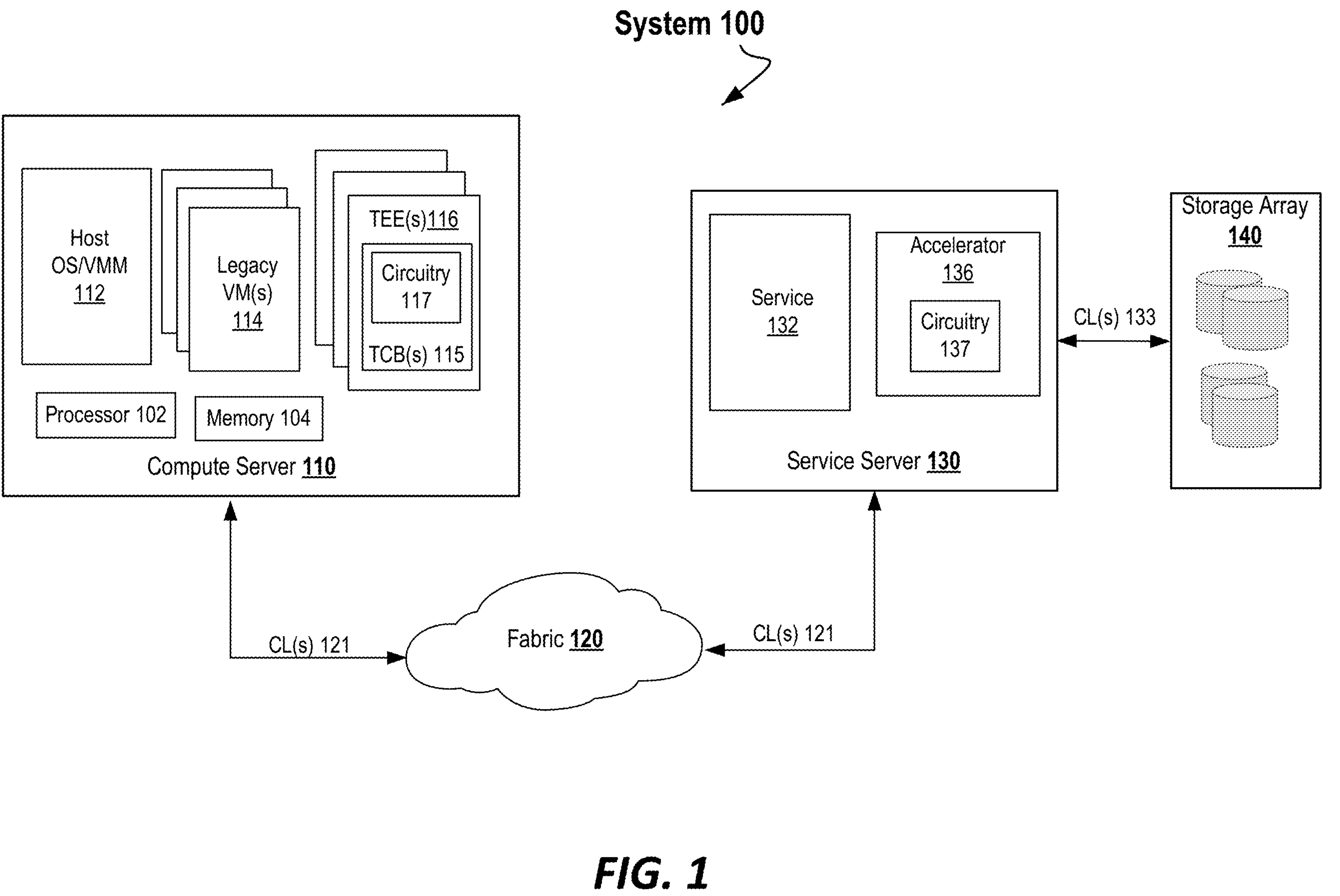
FIG. 1 illustrates an example first system.

A (e.g., hardware) processor (e.g., having one or more cores) at a compute server of a datacenter executed instructions (e.g., a thread of instructions) to operate on data, for example, to perform arithmetic, logic, or other functions. In some examples, software requests an operation and a hardware processor (e.g., a core or cores thereof) performs the operation in response to the request. Certain operations include accessing one or more memory or storage locations, e.g., to store and/or read (e.g., load) data. A system at a compute server can include a plurality of cores, e.g., with a proper subset of cores in each socket of a plurality of sockets, e.g., of a system-on-a-chip (SoC) or a system-on-a-package (SoP). In some examples, each core (e.g., each processor or each socket) can be capable of requesting access to one or more storage devices located at and/or controlled by a storage service server (e.g., to read or write data). The one or more storage devices can include, for example, non-volatile or persistent types of memory. Requested access, for example, can be routed via one or more communication links included in a datacenter fabric.

In some examples of computing, a virtual machine (VM) (e.g., guest) can emulate a physical computer system. For these examples, VMs can be based on a specific computer architecture and provide the functionality of an underlying physical computer system. VM implementations can involve specialized hardware, firmware, software, or a combination. In certain examples, a VM monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications.

The VMM/hypervisor can manage the backend operation of these VMs by allocating the necessary computing, memory, storage, and other input/output (I/O) resources, such as, but not limited to, an input/output memory management unit (IOMMU) and access to one or more remotely located service servers (e.g., storage service servers) via one or more communication links included in a datacenter fabric. Remotely located, in some examples, indicates that the service servers are located on a separate server platform that can be located in a separate rack shelf of a same server rack of a datacenter or located on a rack shelf of a separate server rack of the datacenter. The VMM can provide a centralized interface for managing the entire operation, status, and availability of VMs that are installed over a single host compute server or spread across different and interconnected host compute servers.

In some examples, it is desirable to maintain security (e.g., confidentiality) of information for a VM from a VMM, an OS, other VM(s) at a host compute server, a datacenter fabric coupled between the host compute server and a service server, or the service server via establishment of a TEE for the VM to operate within. The VMM, the OS, the other VM(s), the datacenter fabric and the service server are deemed as untrusted and outside of the TEE's TCB, once a TEE is established for the VM. In an example where the service server is a storage service server, since the VMM, OS, datacenter fabric and storage service server are not trusted by the established TEE, data sent outside the TEE's TCB needs to be encrypted to maintain confidentiality. The storage service server would then receive encrypted data and due to the storage service server not being trusted, will not have needed information (e.g., session keys) to decrypt the encrypted data. An inability to decrypt the data can cause the storage service server to have a limited ability to compress data stored to one or more storage devices coupled with or maintained at the storage service server. As a result, the storage service server is limited in its ability to achieve storage space savings via data compression and/or perform other storage-related operations on the encrypted data (e.g., de-duplication). Examples described in this disclosure provide example techniques, schemes or flows to authenticate and provide a remote accelerator or a service server with information to reach a level of trust with a TEE operated at a compute server to enable the remote accelerator or the service server to decrypt and encrypt data to be written to or read from storage devices at or coupled with the service server responsive to a work request from the TEE. Once a level of trust with the TEE has been established, the remote accelerator or service server can have an ability to perform data compression and/or other storage-related operations on data to be written to or read from the storage devices and maintain data security/confidentiality requirements for the TEE operated at the compute server.

FIG. 1 illustrates an example system 100. In some examples, system 100 can be included in and/or operate within a datacenter. As shown in FIG. 1, system 100 includes a compute server 110 communicatively coupled with a remotely located service server 130 via one or more communication links (CL(s)) 121 included in and/or routed through fabric 120. Remotely located, in some examples, indicates that service server 130 can be located on a separate server platform from compute server 110 and that separate server platform can be located in a separate rack shelf of a same server rack of a datacenter or located on a rack shelf at a separate server rack of the datacenter. Also, as shown in FIG. 1, service server 130 can be communicatively coupled with a storage array 140 via one or more CL(s) 133.

According to some examples, as shown in FIG. 1, compute server 110 includes a processor 102, a memory 104, a host OS/VMM 112, one or more legacy VM(s) 114 and one or more TEE(s) 116. For these examples, legacy VM(s) 114 represent tenant VMs hosted by compute server 110 that are not configured to operate within a TEE. Meanwhile TEE(s) 116 represent tenant VMs configured to operate in individual TEEs that run on compute server 110. Each individual TEE of TEE(s) 116 has a trusted computing base (TCB) 115 that includes hardware (e.g., processor core(s), memory, storage, communication interfaces, etc.), firmware, and/or software hosted by compute server 110. For example, one or more cores of processor 102 or at least a portion of memory 104 are included in TCB(s) 115 as well as other hardware, firmware, and/or software (not shown in FIG. 1) that is hosted by compute server 110. Host OS/VMM 112 and legacy VM(s) 114 are not included in a TCB for TEE(s) 116 and are deemed as untrusted in regard to confidential computing information that is being protected by TEE(s) 116. TEE(s) 116 can be arranged to operate according to Intel® TDX, Intel® SGX, AMD® Secure Encrypted Virtualization or ARM® TrustZone technology. Examples are not limited to these examples of operating environments or technologies for TEE(s) 116, other types of trusted execution environments are contemplated.

In some examples, as shown in FIG. 1, service server 130 includes a service 132 and an accelerator 136. For these examples, accelerator 136 is considered as a remote accelerator in relation to TEE(s) 116 for the same or similar reasons as stated above for service server 130 being remote to compute server 110. Accelerator 136 can be arranged to facilitate/accelerate services requested by TEE(s) 116. In one example, a requested service can be a storage service that provides access to storage array 140 by TEE(s) 116 to read data from or write data to one or more storage devices included in storage array 140. At least some elements or components utilized by TEE(s) 116 to access storage array 140 to include, but not limited to, host OS/VMM 112, fabric 120, service 132 and storage array 140 are considered as untrusted and confidential data associated with TEE(s) 116's access to storage array 140 needs to be encrypted as it passes to/from storage array 140 in order to maintain confidentiality. As described more below, circuitry 117 of TEE(s) 116 that is shown in FIG. 1 as being included in TCB(s) 115 and circuitry 137 at accelerator 136 can include logic and/or features configured to establish a trusted enclave/hardened-logic at accelerator 136 with TEE(s) 116. The trusted enclave/hardened-logic at accelerator 136, once established, enables accelerator 136 to accept encrypted data, decrypt the encrypted data, securely perform one or more operations on the decrypted data, and then re-encrypt the data. In other words, the established enclave/hardened-logic at accelerator 136 effectively brings accelerator 136 into TEE(s) 116 TCB and ensures that the encrypted data is received by accelerator 136 (either from TEE(s) 116 or storage array 140), and the encrypted data leaves accelerator 136 and as a result, all processing/optimizations on the data are done securely by logic and/or features of circuitry 137 at accelerator 136 while maintaining confidentiality of the data.

In some examples, accelerator 136 can be configured as various types of accelerators. For example, a first type of accelerator is an accelerator circuit, e.g., an In-Memory Analytics accelerator (IAA). A second type of accelerator can be configured to support a set of transformation operations on data to be read from or written to storage array 140. This second type of accelerator includes, but is not limited to, an Intel® data streaming accelerator (DSA). The second type of accelerator (e.g., DSA) can be configured to generate and test cyclic redundancy check (CRC) checksum or Data Integrity Field (DIF) to support storage and networking applications and/or for memory state compare and delta generate/merge to support VM migration, VM fast check-pointing, and software managed data deduplication usages. A third type of accelerator supports security, authentication, and compression operations (e.g., cryptographic acceleration and compression operations). This third type of accelerator includes, but is not limited to, an Intel® QuickAssist Technology (QAT) accelerator. A fourth type of accelerator supports data computation (e.g. AI training, AI inference) and data transformation (e.g. media encode, media decode) operations. This fourth type of accelerator includes, but is not limited to, General-Purpose Graphics Processing Unit (GP-GPU).

According to some examples, circuitry 117 of TEE(s) 116 can include a separate field programmable gate array (FPGA), application specific integrated circuit (ASIC), one or more cores of a general purpose processor central processing unit (CPU) hosted by and/or resident on compute server 110. Also, circuitry 137 of accelerator 136 can include an FPGA, ASIC or one or more cores of a CPU resident on accelerator 136 and hosted by service server 130.

In some example, the one or more storage devices included in storage array 140 can include volatile or non-volatile types of memory. The one or more storage devices can include, but are not limited to, solid state drives (SSDs). Also, memory 104 at compute server 110 can include volatile or non-volatile types of memory. Volatile types of memory can include, but are not limited to, random-access memory (RAM), Dynamic RAM (DRAM), DDR synchronous dynamic RAM (DDR SDRAM), GDDR, HBM, static random-access memory (SRAM), thyristor RAM (T-RAM) or zero-capacitor RAM (Z-RAM). Non-volatile memory can include byte or block addressable types of non-volatile memory having a 3-dimensional (3-D) cross-point memory structure that includes, but is not limited to, chalcogenide phase change material (e.g., chalcogenide glass) hereinafter referred to as "3-D cross-point memory". Non-volatile types of memory can also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM), or a combination of any of the above.

According to some examples, fabric 120 can be operated according to one or more networking and/or communication technologies or standards to include, but not limited to, one or more Ethernet standards promulgated by the Institute of Electrical and Electronics Engineers (IEEE). For example, one such Ethernet standard promulgated by IEEE includes, but is not limited to, IEEE 802.3-2018, Carrier sense Multiple access with Collision Detection (CSMA/CD) Access Method and Physical Layer Specifications, Published in August 2018 (hereinafter "IEEE 802.3 specification"). Fabric 120 can also operate according to one or more InfiniBand Architecture or Fibre Channel specifications and can utilize remote direct memory access (RDMA) over Converged Ethernet (RoCE) or iWARP protocols (e.g., to enable TEE(s) 116 to access storage devices included in storage array 140). Also, at least some communication links routed through fabric 120 can be configured to operate according to the Non-Volatile Memory Express (NVMe) over Fabric (NVMe-oF) specification.

Figure 2:
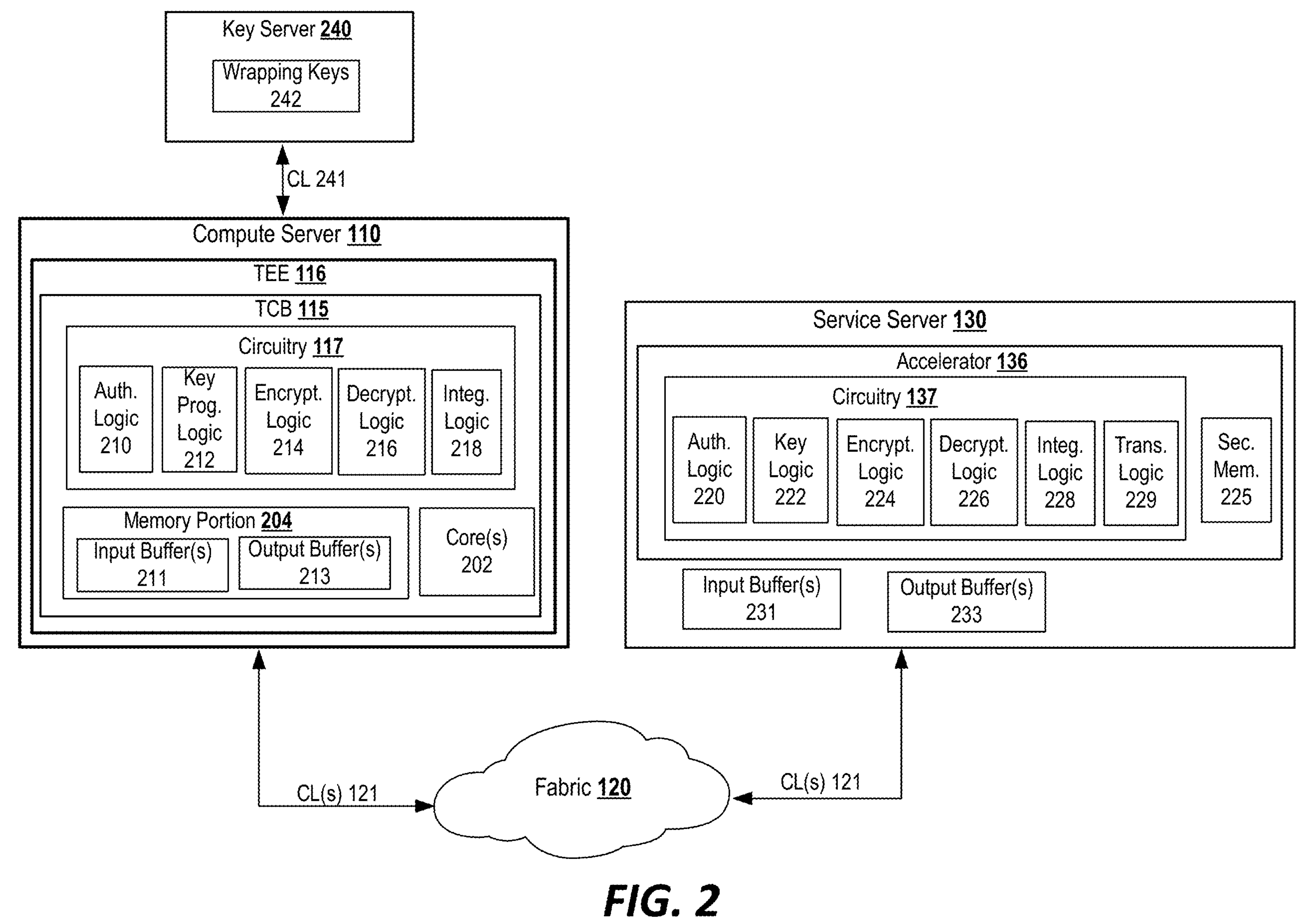
FIG. 2 illustrates additional details of the example first system.

FIG. 2 illustrates additional details of example system 100. As shown in FIG. 2, TEE 116 at compute server 110 is shown as having a TCB 115 that include one or more core(s) 202 and a memory portion 204 that includes one or more input buffer(s) 211 and one or more output buffer(s) 213. The one or more core(s) 202, for example, is a/are core(s) of processor 102 and the memory portion 204, for example, is a portion of memory 104 (both shown in FIG. 1). TCB 115 is also shown as including circuitry 117. In some examples, as shown in FIG. 2, circuitry 117 can be arranged or configured to execute or implement an authentication logic 210, a key programming logic 212, an encryption logic 214, a decryption logic 216, or an integrity logic 218. Also, as shown in FIG. 2, circuitry 137 of accelerator 136 at service server 130, in some examples, can be arranged or configured to execute or implement an authentication logic 220, a key logic 222, an encryption logic 224, a decryption logic 226, an integrity logic 228, or a transformation logic 229. As described more below, the various logic shown in FIG. 2 as included in circuitry 117 enable TEE 116 to authenticate a remote accelerator such as accelerator 136 at service server 130 that is communicatively coupled to compute server 110 via CL(s) 121 routed through fabric 120. Information can then be exchanged between TEE 116 and an authenticated accelerator 136 to enable accelerator 136 to verify an integrity of encrypted data (e.g., to be written to or read from one or more storage devices included in storage array 140), decrypt the data, perform operations on decrypted data, provide integrity checks for possible transformations of the data (e.g., generate a cyclic redundancy check (CRC) value for the data), and then encrypt the possibly transformed data.

According to some examples, input buffer(s) 211 and output buffer(s) 213 of memory portion 204 are included in TCB 115 and are therefore trusted. However, confidential data going or coming from outside of TEE 116 through these buffers is to be encrypted to maintain confidentiality. In some examples, based on the type of operation only one of input buffer(s) 211 or output buffer(s) 213 is included in TCB 115. Also, one or more input buffer(s) 231 and one or more output buffer(s) 233 at service server 130 can be located outside of an established trusted enclave between TEE 116 and accelerator 136 and are outside of TCB 115 and thus are untrusted. Confidential data passing from/to accelerator 136 through input buffer(s) 231 and output buffer(s) 233 is to be encrypted to maintain confidentiality. However, secure memory 225 at accelerator 136 is deemed as being located within the established trusted enclave and logic and/or features of circuitry 137 can utilize secure memory 225 to at least temporarily store decrypted data being operated on (e.g., transformed) by accelerator 136. Input buffer(s) 211/231, output buffer(s) 213/233 and secure memory 225 can include volatile and/or non-volatile types of memory.

In some examples, as described more below, a key server 240 is utilized to provide wrapping keys included in wrapping keys 242 to TEE 116 to provide information to facilitate accelerator 136's ability to encrypt/decrypt data. As shown in FIG. 2, key server 240 is communicatively coupled with compute server 110 via CL 241 to exchange information with TEE 116 in order to receive an encrypted wrapping key that is then used by circuitry of accelerator 136 to program a key table that can be subsequently used to encrypt/decrypt data. More details are described below regarding use of an encrypted wrapping key to program a key table.

Figure 3:
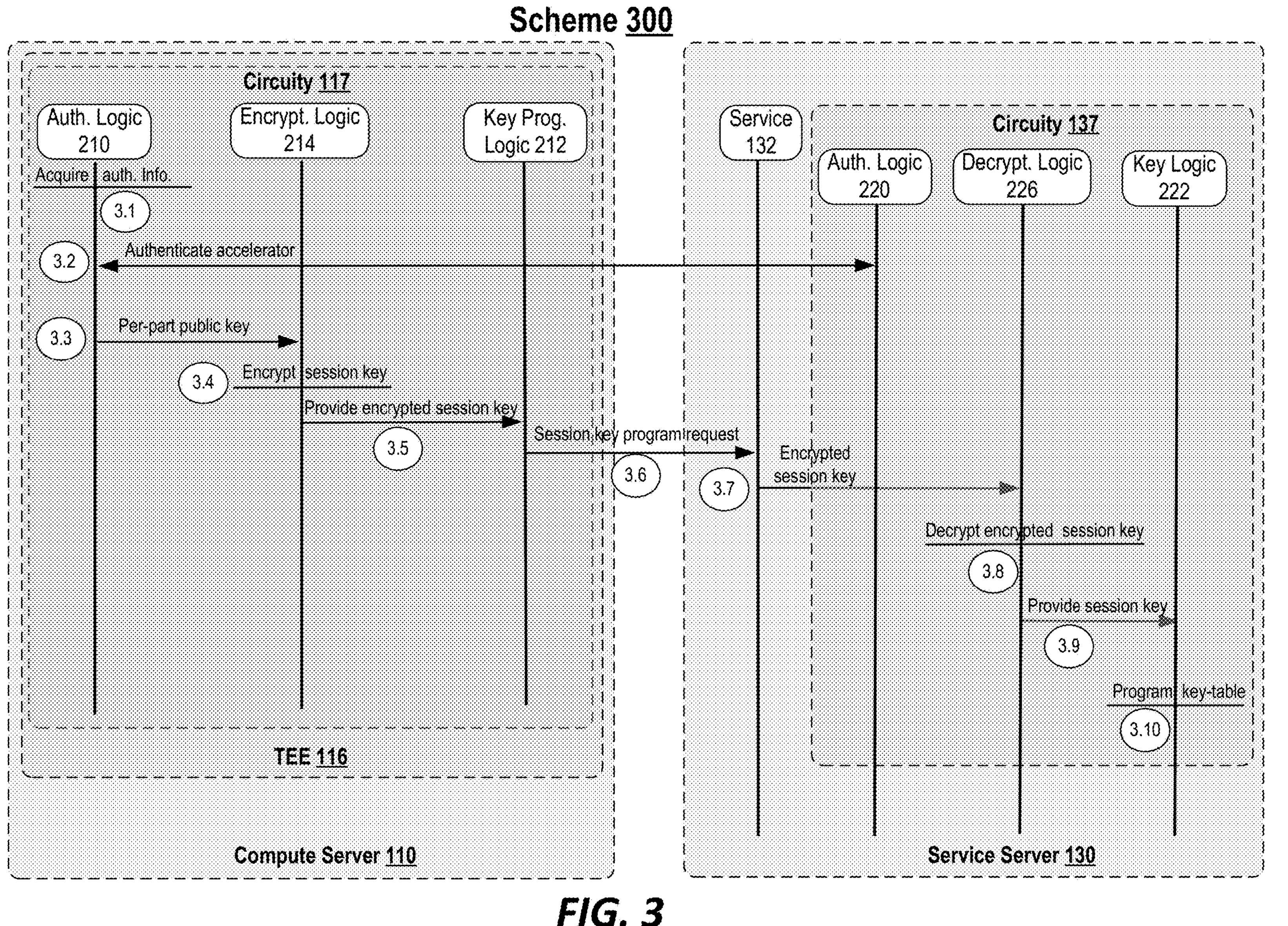
FIG. 3 illustrates an example first scheme to authenticate an accelerator and program a key table at the accelerator.

FIG. 3 illustrates an example scheme 300. In some examples, scheme 300 is a way to establish a secure session between TEE 116 at compute server 110 with accelerator 136 at service server 130 via programming of session keys to a key table maintained at accelerator 136. For these examples, as shown in FIG. 3, logic and/or features of circuitry 117 of TEE 116 to include, but not limited to, authentication logic 210, key programming logic 212, and encryption logic 214 and logic and/or features of circuitry 137 of accelerator 136 to include, but not limited to, authentication logic 220, key logic 222, and decryption logic 226 are utilized to establish a secure session between TEE 116 and accelerator 136. The established secure session can facilitate maintaining a trusted enclave between TEE 116 and accelerator 136. Service 132 at service server 130 can also be involved in at least receiving requests from TEE 116 and forwarding information to accelerator 136 to facilitate establishing the secure session.

According to some examples, at 3.1, authentication logic 210 of circuitry 117 can be capable of using various specifications to include, but not limited to, a Distributed Management Task Force (DMTF) Secure Protocol and Data Model (SPDM) specification such as the SPDM specification, DSP0274, Ver. 1.0.1, published in March, 2021 by the Platform Management Components Intercommunication (PMCI) working group of the DMTF (hereinafter "the SPDM specification") to acquire authentication information from/about accelerator 136. For these examples, use of an SPDM messaging protocol can include acquiring certificates and measurements associated with accelerator 136.

In some examples, at 3.2, authentication logic 210 of circuitry 117 works in cooperation with authentication logic 220 of circuitry 137 to authenticate accelerator 136. For these examples, authentication logic 210 and authentication logic 220 implements a request-response messaging model described in the SPDM specification that includes a message exchange using an SPDM messaging protocol, for example, where each SPDM request message shall be responded to with an SPDM response message. For these examples, "measurement" for accelerator 136 can describe a process of using acquired certificate and measurement information for authentication logic 210 of TEE 116 to calculate a cryptographic hash value and tie the cryptographic hash value with accelerator 136's identity through a use of digital signatures. This allows authentication logic 210 of circuitry 117 to authenticate the identity of accelerator 136 if an SPDM response message from authentication logic 220 of circuitry 137 includes a value that matches the calculated cryptographic hash value. Following this authentication, accelerator 136 is now deemed as trusted and is brought within the TCB of TEE 116.

According to some examples, at 3.3, authentication logic 210 of circuitry 117 obtains a per-part public key associated with accelerator 136 and provide the per-part public key to encryption logic 214 of circuitry 117. In some examples, the per-part public key could have been obtained during the authentication process mentioned above at 3.2 of scheme 300. In other examples, the per-part public key can be obtained from a certificate authority (e.g., a public key infrastructure server).

In some examples, at 3.4, encryption logic 214 of circuitry 117 uses the per-part public key associated with accelerator 136 to encrypt a session key.

According to some examples, at 3.5, encryption logic 214 of circuitry 117 provides the encrypted session key to key programming logic 212 of circuitry 117.

In some examples, at 3.6, key programming logic 212 of circuitry 117 generates a session key programming request and sends the session key programming request to service 132 at service server 130. For these examples, the session key programming request includes the encrypted session key provided by encryption logic 214 and can be sent through CL(s) 121 routed through fabric 120.

According to some examples, at 3.7, service 132 forwards the encrypted session key to decryption logic 226 of circuitry 137. For these examples, the encrypted session key can be included in a work request sent to accelerator 136 and decryption logic 226 can be configured to obtain the encrypted session key from the work request received from service 132.

In some examples, at 3.8, decryption logic 226 of circuitry 137 decrypts the encrypted session key. For these examples, the encrypted session key is decrypted using a private key that is accessible only by logic and/or features of circuitry 137. In other words, the private key is a per-part private key specific to accelerator 136 and/or circuitry 137.

According to some examples, at 3.9, decryption logic 226 of circuitry 137 provides the decrypted session key to key logic 222 of circuitry 137. For these examples, decryption logic 226 provides the session key to key logic 222 based on the work request indicating that TEE 116 has placed a session key program request.

In some examples, at 3.10, key logic 222 of circuitry 137 programs a key table to include the session key provided by decryption logic 226. For these examples, the session key is included in an indexed entry of a key table (e.g., maintained in secure memory 225). The index value to use for the entry, for example, is indicated in the session key program request. As described more below, subsequent work requests originating from TEE 116 can indicate that index value to facilitate retrieval of the session key from the key table and then use the retrieved session key for decrypting/encrypting data received from or to be sent to TEE 116. If no other session keys are to be programmed to a key table, scheme 300 then comes to an end. If an additional session key is to be programmed, then scheme 300 would move back to 3.4 to program the key table for the additional session key and so forth until all session keys are programmed to the key table.

FIG. 4 illustrates an example key table 400. According to some examples, as shown in FIG. 4, key table 400 includes a valid/present bit and session key information columns. As mentioned above for scheme 300 session keys can be programmed to a key table. The programmed key table can be in the example format of key table 400 shown in FIG. 4. Key material (e.g., session key, initialization vector) programed to each entry in key table 400 can be based on an indicated key index value in a session key programming request sent by logic and/or features of circuitry 117 of TEE 116. The indicated key index value, for example, refers to a row of a programmed key table that is in the format of example key table 400. Also, a valid/present bit for each entry of key table 400 can be set (e.g., value of "1") to indicate that key material included in a respective entry is valid and present or can be cleared (e.g., value of "0) to indicate that key material in a respective entry is invalid (e.g., expired) or is not present for that entry. In some examples, a work request related to a given established session received from TEE 116 includes a key index value that is used by logic and/or features of circuitry 137 of accelerator 136 to determine what session keys included in key material 410-0 to 410-N, where "N" is any whole, positive number >2, are to be used to decrypt and encrypt data associated with the given established secure session. For example, a key index value of 2 would indicate that the third row of key table 400 that includes key material 410-2 is to be used to decrypt and encrypt data associated with a work request that include the key index value of 2, provided that the valid/present bit is set for the table 400 entry that includes key material 410-2.

Figure 5:
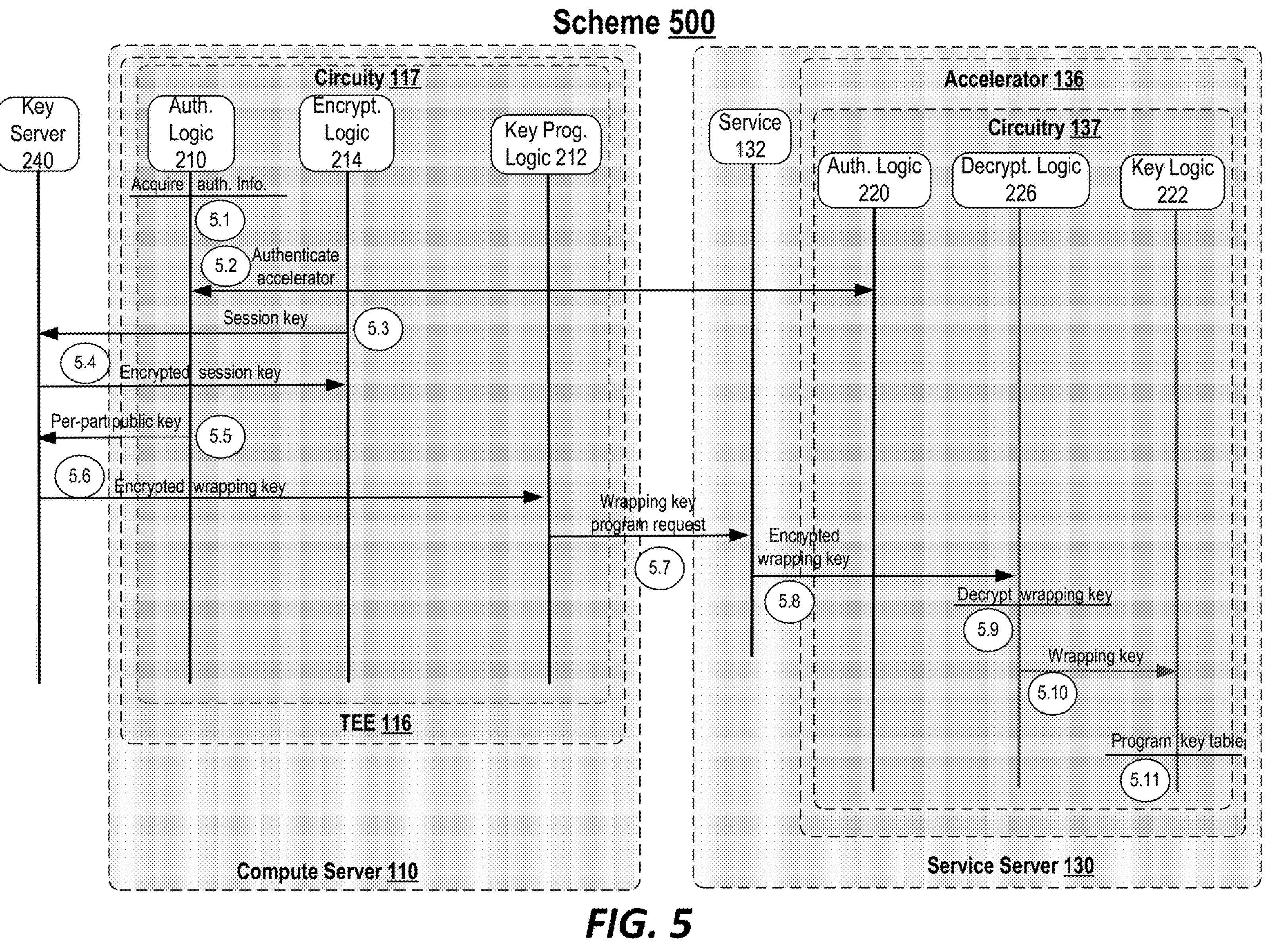
FIG. 5 illustrates an example second scheme to authenticate an accelerator and program a key table at the accelerator.

FIG. 5 illustrates an example scheme 500. In some examples, scheme 500 is a way to establish a secure session between TEE 116 at compute server 110 with accelerator 136 at service server 130 via programming of wrapping keys to a key table maintained at accelerator 136. For these examples, wrapping keys are programmed to a key table for later use to decrypt encrypted session keys included in work requests that are received subsequent to programing the wrapping keys to the key table. Also for these examples, as shown in FIG. 5, logic and/or features of circuitry 117 of TEE 116 to include, but not limited to, authentication logic 210, key programming logic 212, and encryption logic 214 and logic and/or features of circuitry 137 of accelerator 136 to include, but not limited to, authentication logic 220, key logic 222, and decryption logic 226 can be utilized to establish a secure session. The established secure session facilitates maintaining a trusted enclave between TEE 116 and accelerator 136. Service 132 at service server 130 can also be involved in at least receiving requests from TEE 116 and forwarding information to accelerator 136 to facilitate establishing the secure session. Also, key server 240 can be utilized by TEE 116 to obtain encrypted wrapping keys that will be subsequently decrypted by accelerator 136 and programmed to a key table maintained at accelerator 136.

According to some examples, at 5.1, authentication logic 210 of circuitry 117 can utilize SPDM messaging protocols and/or methods described in the SPDM specification to acquire at least one certificate and measurement associated with accelerator 136.

In some examples, at 5.2, authentication logic 210 of circuitry 117 works in cooperation with authentication logic 220 of circuitry 137 to authenticate accelerator 136. For these examples, authentication logic 210 and authentication logic 220 can implement a request-response messaging model described in the SPDM specification that includes a message exchange using an SPDM messaging protocol, for example, where each SPDM request message shall be responded to with an SPDM response message. Similar to scheme 300, for these examples, "measurement" for accelerator 136 includes using acquired certificate and measurement information for authentication logic 210 of circuitry 117 to calculate a cryptographic hash value and tie the cryptographic hash value with accelerator 136's identity through a use of digital signatures. This allows authentication logic 210 of circuitry 117 to authenticate the identity of accelerator 136 if an SPDM response message from authentication logic 220 of circuitry 137 includes a value that matches the calculated cryptographic hash value. Following this authentication, accelerator 136 is now deemed as trusted and is brought within the TCB of TEE 116.

According to some examples, at 5.3 encryption logic 214 of circuitry 117 generates and send a session key to key server 240 (e.g., via CL 241). For these examples, key server 240 can serve as either a public (e.g., PGP key servers) or proprietary certificate authority for public key cryptography.

In some examples, at 5.4, key server 240 uses a wrapping key (e.g., from among wrapping keys 242 maintained at key server 240) to encrypt the session key that was sent from encryption logic 214 of circuitry 117. For these examples, key server 240 then sends the encrypted session key to encryption logic 214 of TEE 116 for subsequent use in work requests (described more below) to enable accelerator 136 to decrypt data that was encrypted using the session key to perform operations on the data as requested in the work requests and then re-encrypt the data following performance of the requested operations.

According to some examples, at 5.5, authentication logic 210 of circuitry 117 obtains a per-part public key associated with accelerator 136 and provide the per-part public key to key server 240. In some examples, the per-part public key was obtained during the authentication process mentioned above at 5.2 of scheme 500. In other examples, the per-part public key was obtained from a certificate authority (e.g., a public key infrastructure server).

In some examples, at 5.6, key server 240 uses the per-part public key associated with accelerator 136 to encrypt the same wrapping key that was used to encrypt the session key mention above at 5.4 of scheme 500 For these examples, since the wrapping key is encrypted using the per-part public key associated with accelerator 136, only logic and/or features of accelerator 136 (e.g., decryption logic 226) can decrypt this encrypted wrapping key using a private key known/accessible to only to accelerator 136. Similarly, since the session key was encrypted using the wrapping key, only accelerator 136 who has access to the wrapping key can decrypt the encrypted session key.

According to some examples, at 5.7, key programming logic 212 of circuitry 117 generates a wrapping key programming request and sends the wrapping key programming request to service 132 at service server 130. For these examples, the wrapping programming request includes the encrypted wrapping key provided by key server 240. The wrapping programming request with the encrypted wrapping, for example, can be sent through CL(s) 121 routed through fabric 120.

In some examples, at 5.8, service 132 forwards the encrypted wrapping key to decryption logic 226 of circuitry 137. For these examples, the encrypted wrapping key could be included in a work request sent to accelerator 136 and decryption logic 226 can be configured to obtain the encrypted wrapping key from the work request received from service 132.

According to some examples, at 5.9, decryption logic 226 of circuitry 137 decrypts the encrypted wrapping key. For these examples, the wrapping session key is decrypted using a private key that is accessible only by logic and/or features of circuitry 137. In other words, the private key is a per-part private key specific to accelerator 136 and/or circuitry 137.

In some examples, at 5.10, decryption logic 226 of circuitry 137 provides the decrypted wrapping key to key logic 222 of circuitry 137. For these examples, decryption logic 226 provides the wrapping key to key logic 222 based on the work request indicating that TEE 116 has placed a wrapping key program request.

In some examples, at 5.11, key logic 222 of circuitry 137 programs a key table to include the wrapping key provided by decryption logic 226. For these examples, the wrapping key could be included in an indexed entry of a key table (e.g., maintained in secure memory 225). The index value to use for the entry, for example, is indicated in the wrapping key program request. As described more below, subsequent work requests originating from TEE 116 can indicate that index value to facilitate retrieval of the wrapping key from the key table and then use the retrieved wrapping key to then decrypt an encrypted session key for decrypting/encrypting data received from or to be sent to TEE 116. In some examples, the subsequent work requests can contain i) the actual encrypted session key, (ii) a memory address, accessible to accelerator 136, where the encrypted session key is stored, or (iii) a memory address for context which stores the encrypted session key. If no other wrapping keys are to be programmed to a key table, scheme 500 then comes to an end. If additional wrapping key(s) is/are to be programmed, then scheme 500 would move back to 5.3 to program the key table for the additional wrapping key(s) to decrypt additional encrypted session key(s) and so forth until all wrapping keys are programmed to the key table.

FIG. 6 illustrates an example key table 600. According to some examples, as shown in FIG. 6, key table 600 includes a valid/present bit and wrapping key information columns. As mentioned above for scheme 500 wrapping keys can be programmed to a key table. The programmed key table can be in the example format of key table 600 shown in FIG. 6. Key material (e.g., wrapping key, initialization vector) programed to each entry in key table 600 can be based on an indicated key index value in a wrapping key programming request sent by logic and/or features of circuitry 117 of TEE 116. The indicated key index value, for example, refers to a row of a programmed key table that is in the format of example key table 600. Also, a valid/present bit for each entry of key table 600 can be set (e.g., value of "1") to indicate that key material included in a respective entry is valid and present or can be cleared (e.g., value of "0) to indicate that key material in a respective entry is invalid (e.g., expired) or is not present for that entry. In some examples, a work request related to a given established session received from TEE 116 can include a key index value that is used by logic and/or features of circuitry 137 of accelerator 136 to determine what wrapping keys included in keys 610-0 to 610-N are to be used to decrypt a corresponding encrypted session key, the decrypted session key is then used to encrypt data associated with the given established secure session. For example, a key index value of 1 would indicate that key 610-1 is to be used to decrypt a corresponding encrypted session key that was encrypted with this wrapping key maintained key table 600.

Figure 7:
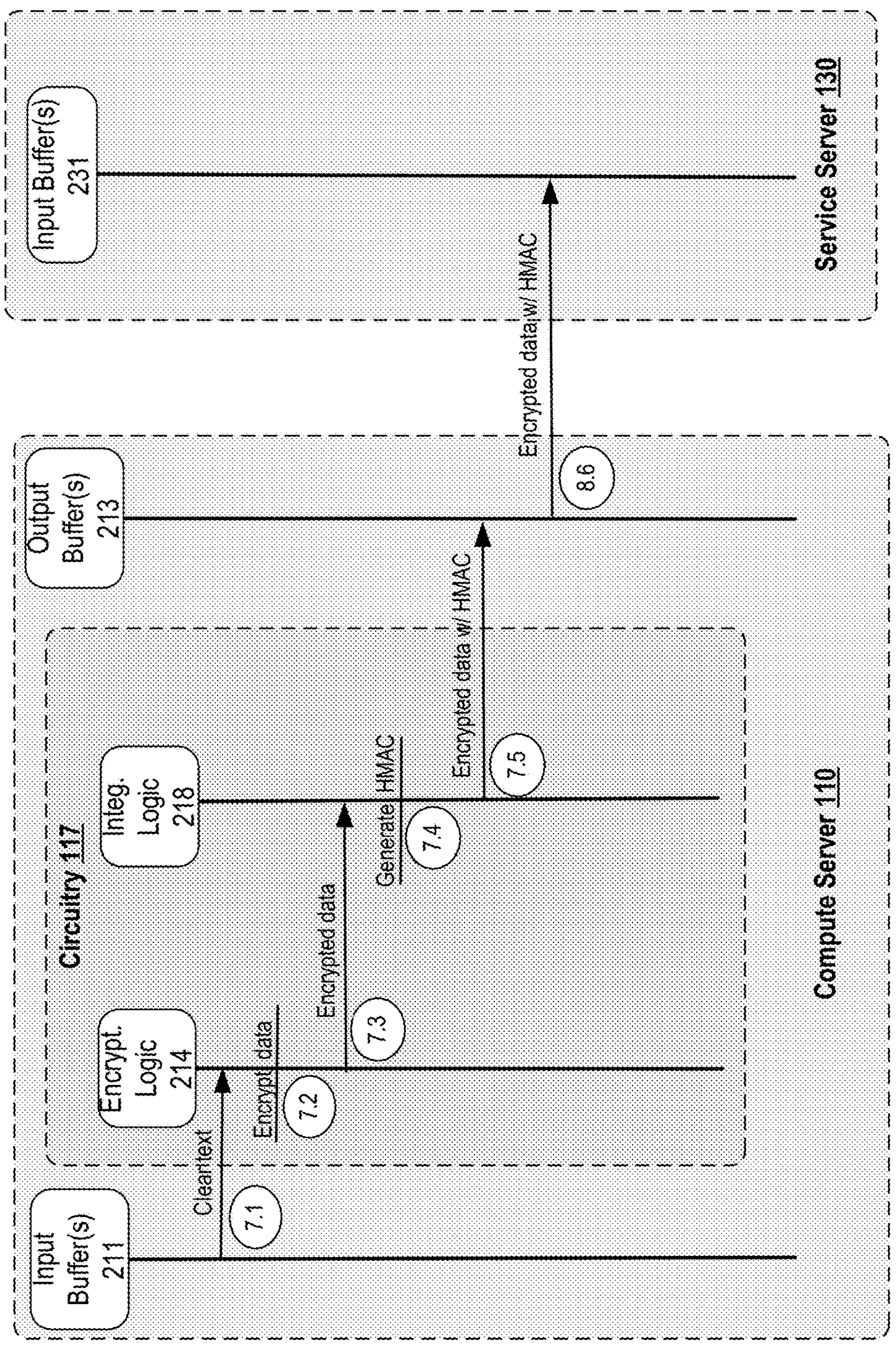
FIG. 7 illustrates an example write flow at a compute server.

FIG. 7 illustrates an example write flow 700. In some examples, as shown in FIG. 7, write flow 700 can include logic/or features of circuitry 117 of TEE 116 to pull data from one or more input buffer(s) 211 at compute server 110, encrypt the data and send the encrypted data to input buffer(s) 231 at service server 130 through one or more output buffer(s) 213 of compute server 110. For these examples, the logic and/or features of circuitry 117 to implement write flow 700 can include, but are not limited to, encryption logic 214 and integrity logic 218. Write flow 700 assumes that a secure session has been established between TEE 116 and accelerator 136 at service server 130 as described above for scheme 300 or 500. As described more below, accelerator 136 can pull encrypted data from input buffer(s) 231 during a separate write flow that is specific to accelerator 136.

In some examples, at 7.1, encryption logic 214 of circuitry 117 receives clear text from one or more input buffer(s) 211. For these examples, the clear text is data for which TEE 116 wants to protect its confidentiality. The data included in the clear text for which confidentiality is sought can have a target destination at a storage device, for example, included in storage array 140.

According to some examples, at 7.2, encryption logic 214 encrypts the data included in the clear text. For these examples, encryption logic 214 encrypts the data using a session key that has been either programmed to a key table at accelerator 136 as described above for scheme 300 or can be obtained by accelerator 136 based on a wrapping key being programed to a key table at accelerator 136 as described above for scheme 500.

In some examples, at 7.3, encryption logic 214 provides the encrypted data to integrity logic 218 of circuitry 117.

According to some examples, at 7.4, integrity logic 218 generates a hash-based message authentication code (HMAC) value using a secret key shared with accelerator 136. The shared secret key can be the session key. For these examples, the HMAC value is to be sent with the encrypted data to ensure the encrypted data has not been modified during transit to service server 130. In other words the HMAC value provides data integrity during transit of the encrypted data from compute server 110 to service server 130. For example, logic and/or features of circuitry 137 or accelerator 136, upon receipt of the encrypted data with the HMAC value, generate their own HMAC value using the shared secret key and compare that generated HMAC with the HMAC value sent with the encrypted data. If the values match, integrity is verified. A cryptographic hash function to generate an HMAC value can include, but is not limited to MD-5, SHA-1, or SHA-256.

In some examples, at 7.5, the encrypted data with HMAC is sent to output buffer(s) 213.

According to some examples, at 7.6, the encrypted data with HMAC is sent from output buffer(s) 213 to input buffer(s) 231 at service server 130. Although not shown in FIG. 7, the encrypted data with HMAC can be routed through fabric 120 to reach input buffer(s) 231 at service server 130. Write flow 700 then comes to an end.

In some examples, encryption logic 214 uses algorithms for encryption of data such as, but not limited to, Advanced Encryption Standard (AES) algorithms. One example AES algorithm used by encryption logic 214 is AES-XTS. XTS stands for XEX Tweakable block ciphertext Stealing. Separate generation of an HMAC, as described above for write flow 700, would be needed if encryption logic 214 uses the AES-XTS algorithm. However, other types of AES algorithms that include built-it HMAC functionality can be used by encryption logic 214 and would not require a separate HMAC value to be generated by integrity logic 218. For example, AES-GCM is a type of algorithm that provides both data authenticity (integrity) and confidentiality. GCM stands for Galois/Counter Mode. If encryption logic 214 used an AES-GCM algorithm to encrypt the data, then write flow 700 could be modified to have encryption logic 214 sending the encrypted data directly to output buffer(s) 213 following encryption of the data.

Figure 8:
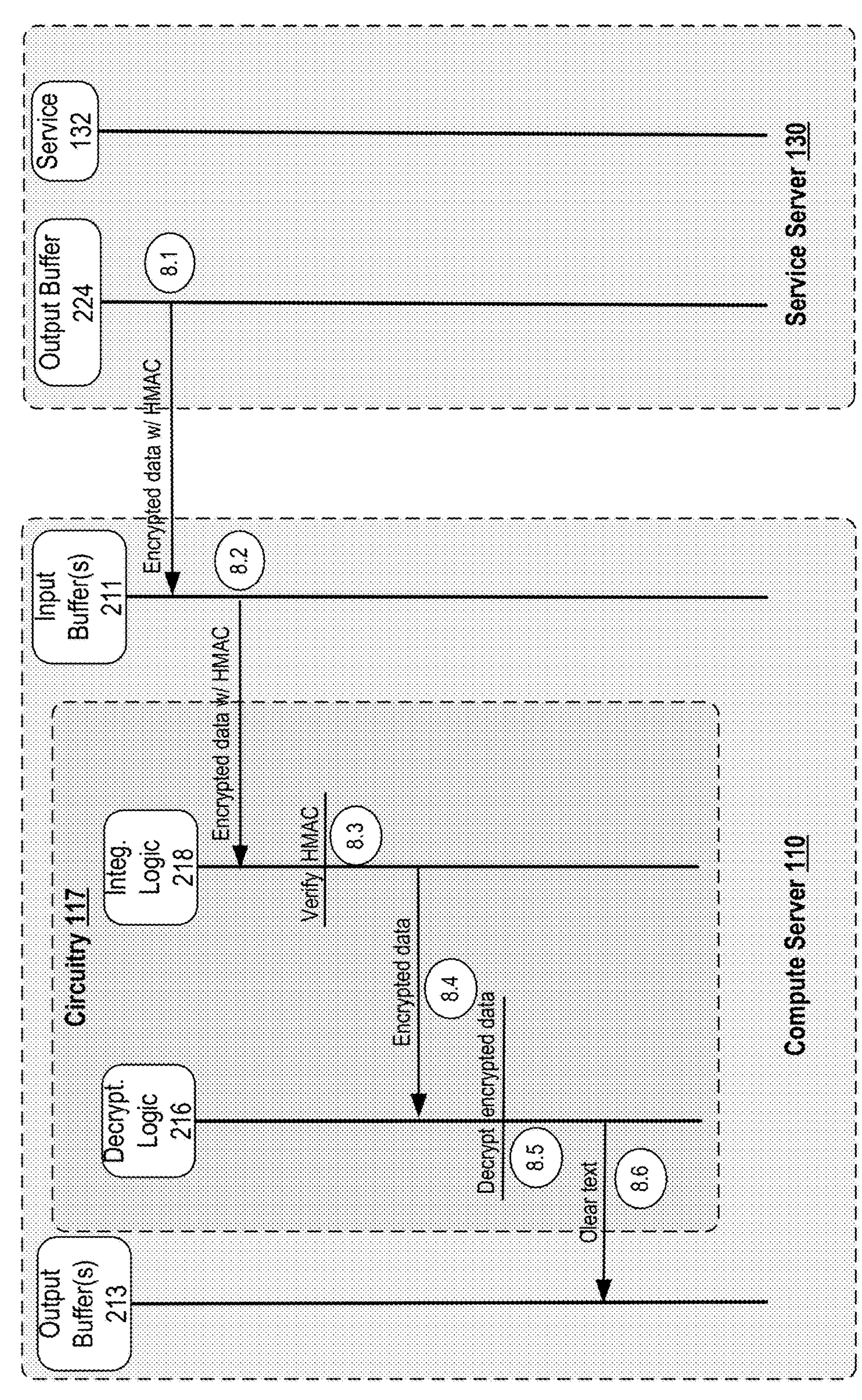
FIG. 8 illustrates an example read flow at a compute server.

FIG. 8 illustrates an example read flow 800. In some examples, as shown in FIG. 8, read flow 800 can include logic/or features of circuitry 117 of TEE 116 to pull encrypted data from input buffer(s) 211 at compute server 110 that was sent from one or more output buffer(s) 233 of service server 130. The encrypted data, for example, was placed in output buffer(s) 233 by logic and/or features of circuitry 137 of accelerator 136, not shown in FIG. 8 but described in a separate read flow below. The logic and/or features of circuitry 117 then verify the integrity of the encrypted data, decrypt the encrypted data and cause decrypted data to be sent to one or more output buffer(s) 213 at compute server 110. For these examples, the logic and/or features of circuitry 117 can include, but are not limited to, decryption logic 216 and integrity logic 218.

Read flow 800 assumes that a secure session has been established between TEE 116 and accelerator 136 at service server 130 as described above for scheme 300 or 500.

According to some examples, at 8.1, encrypted data with HMAC is sent from output buffer(s) 233 at service server 130. For these examples, the encrypted data can include data operated on by accelerator 136 that was encrypted based on a session key that was obtained based on a key table as described above for scheme 300 or scheme 500. Logic and/or features of circuitry 137 or accelerator 136 could have also generated the HMAC that accompanies the encrypted data sent from output buffer(s) 233 to input buffer(s) 211.

In some examples, at 8.2, integrity logic 218 obtains or receives the encrypted data with HMAC.

According to some examples, at 8.3, integrity logic 218 is to verify the HMAC included with the encrypted data. For these examples, integrity logic 218 uses a secret key shared with accelerator 136 to generate an HMAC value and based on the generated HMAC value matching the HMAC sent with the encrypted data, the integrity of the encrypted data is verified. If the HMAC verification fails, read flow 800 stops and integrity logic 218 causes notifications to be sent to TEE 116 and/or service 132 at service server 130 to indicate that the read operation has been aborted due to failure to verify the integrity of the encrypted data.

In some examples, at 8.4, based on a successful verification, the encrypted data is forwarded to decryption logic 216.

According to some examples, at 8.5, decryption logic 216 decrypts the encrypted data.

In some examples, at 8.6, decryption logic 216 causes clear text of the data to be sent to output buffer(s) 213. Read flow 800 then comes to an end.

According to some examples, similar to as mentioned above for write flow 700, decryption logic 216 uses AES algorithms to decrypt data. For example, use of an AES-XTS algorithm would need a separate HMAC to verify the integrity of the encrypted data to be decrypted as described above for read flow 800. Alternatively, use of an AES-GCM algorithm would have built-in HMAC functionality and integrity logic 218 would not need to generate an HMAC value and read flow 800 would be modified to have decryption logic 216 pull the encrypted data from input buffer(s) 211, and based on a successful decryption is able to verify the integrity of the encrypted data.

Figure 9:
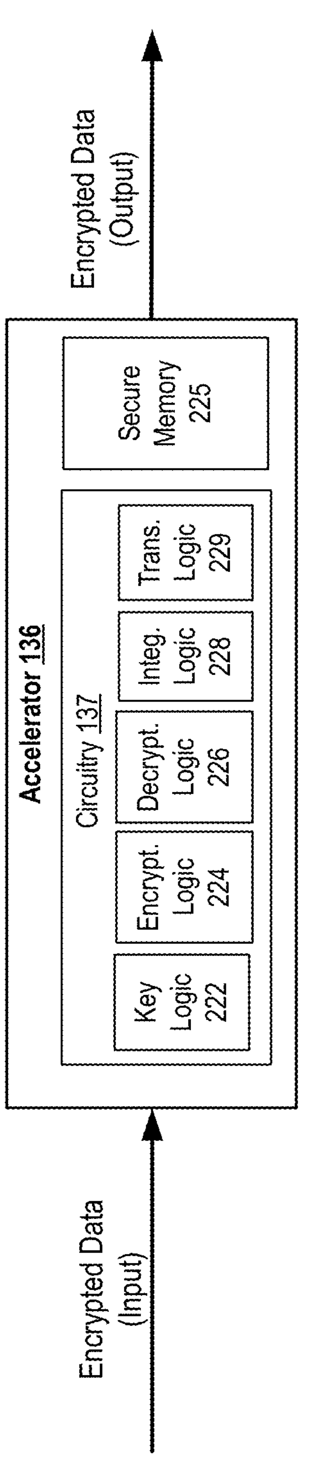
FIG. 9 illustrates an example flow at an accelerator.

FIG. 9 illustrates an example flow 900 at accelerator 136. Flow 900, as shown in FIG. 9, provides a high level example flow of how encrypted data can be received as input to accelerator 136 and, as described more below, logic and/or features of circuitry 137 can be capable of verifying the integrity of the encrypted data, determining a session key to use to decrypt the data, decrypt the encrypted data, securely perform one or more operations on the decrypted data (using secure memory, if needed), and then re-encrypt the data as output. The logic and/or features of circuitry 137 shown in FIG. 9 are key logic 222, encrypt logic 224, decrypt logic 226, integrity logic 228 and transformation logic 229. Also, secure memory 225 can be used, if needed, to facilitate the one or more operations on the decrypted data.

Figure 10:
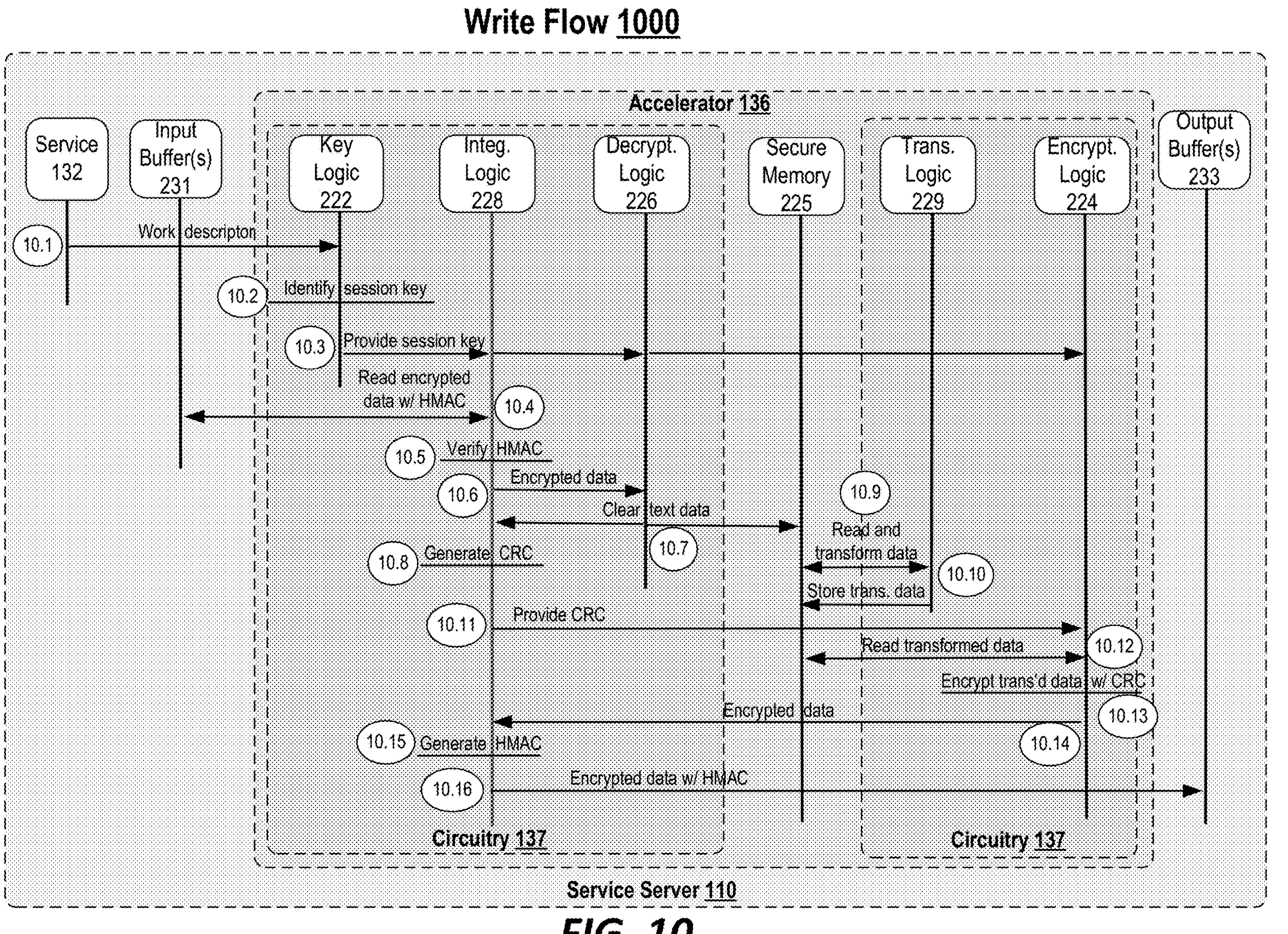
FIG. 10 illustrates an example write flow at an accelerator.

FIG. 10 illustrates an example write flow 1000 at accelerator 136 at service server 130. According to some examples, the logic and/or features of circuitry 137 at accelerator 136 as well as secure memory 225 can be arranged to implement one or more aspects of write flow 1000. Examples are not limited to these logic and/or features of circuitry 137 that include key logic 222, encryption logic 224, decryption logic 226, integrity logic 228 or transformation logic 229 to implement one or more aspects of write flow 1000.

In some examples, write flow 1000 is for writing data to one or more storage devices (e.g., of storage array 140) based on a request originating from TEE 116 at compute server 110. Write flow 1000 assumes that a secure session has been established between TEE 116 and accelerator 136 as described above for scheme 300 or 500 and that the encrypted data was sent to input buffer(s) 231 at service server 130 in a similar manner as describe above for write flow 700 shown in FIG. 7.

According to some examples, at 10.1, service 132 sends a work descriptor to key logic 222 of circuitry 137 at accelerator 136. In other examples, although not shown in FIG. 10, the work descriptor can come directly from TEE 116. For either of these examples, the work descriptor can include a request for accelerator 136 to perform one or more operations on data included in encrypted data placed in one or more input buffer(s) 231. The one or more operations that transform data following decryption and transformation of the data include, but are not limited to, compression operations to compress the data for eventual storage to a storage device (e.g., included in storage array 140), re-compression operations to decompress relatively small compressed blocks of data and combine the data to then be recompressed in an aggregated larger block of data to improve compression ratios, or de-duplication operations to identify possibly duplicated data and prevent duplicated data from being eventually stored to a storage device.

In some examples, at 10.2, key logic 222 is to identify a session key to use for decrypting the data placed in input buffer(s) 231 for which the operations identified in the work descriptor are to be performed. For these example, the work descriptor can include information, such as a table index value, to enable key logic 222 to look up a key table entry for the session key previously programmed to a key table maintained at accelerator 136 such as key table 400. If the table index value refers to a key table including wrapping keys previously programmed to a key table maintained at accelerator 136 such as key table 600, key logic 222 can first lookup the wrapping key and use that wrapping key to decrypt an encrypted session key that was encrypted using the looked up wrapping key. The encrypted session key can be obtained by key logic 222 either (i) in the work descriptor, (ii) from a memory address where the encrypted session key is stored (e.g., input buffer(s) 231), or (iii) a memory address for context which stores the encrypted session key.

According to some examples, at 10.3, key logic 222 provides the session key to integrity logic 228, decryption logic 226 and encryption logic 224, all of circuitry 137.

In some examples, at 10.4, integrity logic 228 reads encrypted data with HMAC from input buffer(s) 231. For these examples, the data to read from input buffer(s) 231 is identified in the work descriptor. For example, the work descriptor includes a memory address and/or one or more queue structures maintained in input buffer(s) 231 that included the encrypted data with its associated HMAC. The data, for example, was encrypted using an AES-XTS algorithm that needs an HMAC to verify integrity. In other examples, where an AES-GCM algorithm was used to encrypt the data, HMAC functionality is built in and the encrypted data would not be accompanied by an HMAC.

In some examples, at 10.5, integrity logic 228 is to verify the HMAC for the encrypted data. For these examples, integrity logic 228 uses the shared secret key and the encrypted data to generate an HMAC value and compares that generated HMAC value to the HMAC read from input buffer(s) 231 with the encrypted data. If the generated HMAC value matches the HMAC read from input buffer(s) 231 with the encrypted data, the integrity of the encrypted data is verified. If a match does not exist, integrity logic 228 notifies service 132 that verification has failed (e.g., the integrity of the encrypted data may have been compromised) and operations indicated in the work descriptor will be ceased.

In some examples, at 10.6, integrity logic 228 forwards the encrypted data to decryption logic based on the integrity of the encrypted data being verified based on the generated HMAC value matching the HMAC read from input buffer(s) 231.

According to some examples, at 10.7, decryption logic 226 uses the session key provided by key logic 222 to decrypt the encrypted data to generate clear text data that is at least temporarily stored to secure memory 225 and also provided to integrity logic 228.

In some examples, at 10.8, integrity logic 228 generates a cyclic redundancy check (CRC) value based on the clear text data. For these examples, the CRC is generated to verify that the original clear text data has not been altered following transformation operations later performed on the clear text data. As mentioned more below, the CRC is to be added to any transformed data before the data is encrypted to ensure any transformation of the data (e.g., compression) is lossless and thus possible to generate an original version of the data (e.g., decompressed data) through a reverse transformation.

According to some examples, at 10.9, transformation logic 229 of circuitry 137 reads the clear text data stored at secure memory 225 and transforms the clear text data based on what was indicated in the work descriptor (e.g., compression, re-compression, de-duplication).

In some examples, at 10.10, transformation logic 229, following an operation to transform the data, causes the transformed data to be at least temporarily stored to secure memory 225.

According to some examples, at 10.11, integrity logic 228 provides the CRC generated at 10.8 to encryption logic 224.

In some examples, at 10.12, encryption logic 224 reads or obtains the transformed data from secure memory 225.

According to some examples, at 10.13, encryption logic 224 encrypts the transformed data with the CRC to generate encrypted data. For example, if the transformed data included compressed data, then encryption logic 224 combines the CRC provided by integrity logic 228 with the compressed data to generate the encrypted data.

In some examples, at 10.14, encryption logic 224 provides the encrypted data to integrity logic 228.

According to some examples, at 10.15, integrity logic 228 uses the encrypted data to generate a new HMAC value for this encrypted data. For these examples, similar to 10.5, integrity logic 228 uses the shared secret key to generate this new HMAC value.

In some examples, at 10.16, integrity logic 228 causes the encrypted data with the new HMAC value to be sent to one or more output buffer(s) 233 at service server 130. Although not shown in FIG. 10, the encrypted data with the new HMAC value that was sent to output buffer(s) 233 can subsequently be sent to a storage device included in storage array 140. Write flow 1000 then comes to an end.

Figure 11:
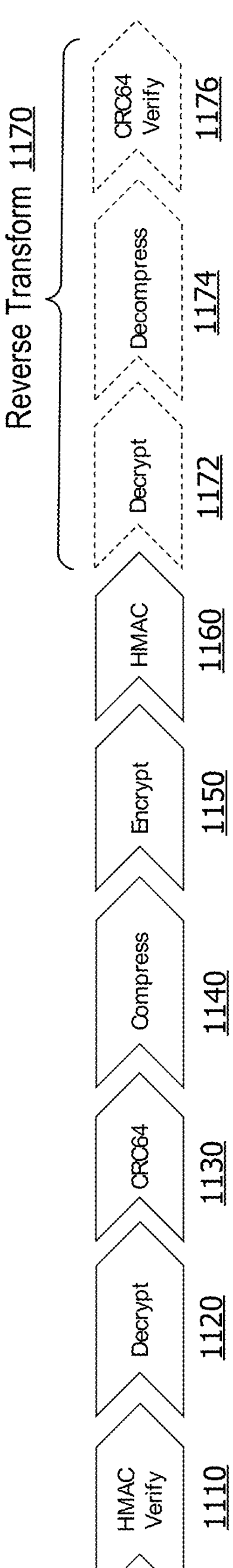
FIG. 11 illustrates an example accelerator write integrity scheme.

FIG. 11 illustrates an example accelerator write integrity scheme 1100. Accelerator write integrity scheme 1100 shown in FIG. 11 provides a high-level example of how logic and/or features of circuitry (e.g., circuitry 137) at an accelerator (e.g., accelerator 136) verify integrity of encrypted data upon receiving or obtaining the encrypted data and take additional steps to protect re-encrypted data following any transformation of the data and to ensure that transformation of the data is lossless via a reverse transform process.

In some examples, at 1110, logic and/or features of the circuitry at the accelerator (e.g., integrity logic 228) verifies an HMAC included in the encrypted data. For example, similar to what was described above in write flow 1000, at 10.5.

According to some examples, at 1120, logic and/or features of the circuitry at the accelerator (e.g., decryption logic 226), decrypts the encrypted data. For example, similar to what was described above in write flow 1000, at 10.7.

In some examples, at 1130, logic and/or features of the circuitry at the accelerator (e.g., integrity logic 228), generates a CRC-64 value using the clear text of the data that was decrypted. For example, similar to what was described above in write flow 1000, at 10.8.

According to some examples, at 1140, logic and/or features of the circuitry at the accelerator (e.g., transformation logic 229), compresses the clear text of the data that was decrypted. For example, similar to what was described above in flow 1000, at 10.9 and 10.10.

In some examples, at 1150, logic and/or features of the circuitry at the accelerator (e.g., encryption logic 224), encrypts the transformed/compressed data. For these examples, the CRC-64 value generated at 1130 is included with the compressed clear text data (examples are not limited to CRC-64 values). For example, similar to what was described above in write flow 1000, at 10.12 and 10.13.

According to some examples, at 1160, logic and/or features of the circuitry at the accelerator (e.g., integrity logic 228), generates a new HMAC value for the encrypted data. For example, similar to what was described above in write flow 1000, at 10.15.

In some examples, as shown in FIG. 11, accelerator write integrity scheme 1100 can have a reverse transform 1170 that includes logic and/or features of the circuitry at the accelerator to implement additional operations to verify an accuracy of the transformation/compression of the data performed at 1140 and the encryption performed at 1150. For these examples, at 1172, logic and/or features of the circuitry at the accelerator (e.g., decryption logic 226), decrypts the encrypted data that results in the compressed data and its accompanied CRC-64 value. Then, at 1174, logic and/or features of the circuitry at the accelerator (e.g., transformation logic 229) decompresses the compressed data. Then, at 1176, logic and/or features of the circuitry at the accelerator (e.g., integrity logic 228), generate a CRC-64 value using the decompressed data and compares the generated CRC-64 value to the CRC-64 included in the decrypted data. A match of CRC-64 values verifies the accuracy of the compression and encryption operations performed at 1140 and 1150. Accelerator write integrity scheme 1100 then comes to an end. A non-match of CRC-64 values indicates that either the compression or the encryption of data could have corrupted the data and remedial actions needs to be taken by the accelerator (e.g., return to at least 1140 of accelerator integrity scheme 1100).

FIG. 12 illustrates an example read flow 1200 at accelerator 136 at service server 130. According to some examples, the logic and/or features of circuitry 137 at accelerator 136 as well as secure memory 225 can be arranged to implement one or more aspects of read flow 1200. Examples are not limited to these logic and/or features of circuitry 137 that include key logic 222, encryption logic 224, decryption logic 226, integrity logic 228 or transformation logic 229 to implement one or more aspects of read flow 1200.

In some examples, read flow 1200 is for reading data from one or more storage devices (e.g., of storage array 140)

based on a request originating from TEE 116 at compute server 110. Read flow 1200 assumes that a secure session has been established between TEE 116 and accelerator 136 as described above for scheme 300 or 500 and that the encrypted data was sent to input buffer(s) 231 at service server 130 in a similar manner as described above for read flow 800 shown in FIG. 8.

According to some examples, at 12.1, service 132 sends a work descriptor to key logic 222 of circuitry 137 at accelerator 136. In other examples, although not shown in FIG. 12, the work descriptor can come directly from TEE 116. For either of these examples, the work descriptor can include a request for accelerator 136 to perform one or more operations on data included in encrypted data placed in one or more input buffer(s) 231. The one or more operations to transform data following decryption can include, but are not limited to, compression operations to decompress the compressed data read from a storage device (e.g., included in storage array 140) or de-duplication operations to identify possibly duplicated data and prevent duplicated data from being sent to TEE 116.

In some examples, at 12.2, key logic 222 is to identify a session key to use for decrypting the data placed in input buffer(s) 231 for which the operations identified in the work descriptor are to be performed. For these example, the work descriptor can include information, such as a table index value, to enable key logic 222 to look up a key table entry for the session key previously programmed to a key table maintained at accelerator 136 such as key table 400. If the table index value refers to a key table including wrapping keys previously programmed to a key table maintained at accelerator 136 such as key table 600, key logic 222 can first look up the wrapping key and use that wrapping key to decrypt an encrypted session key that was encrypted using the looked up wrapping key. The encrypted session key can be obtained by key logic 222 either (i) in the work descriptor, (ii) from a memory address where the encrypted session key is stored (e.g., input buffer(s) 231), or (iii) a memory address for context which stores the encrypted session key.

According to some examples, at 12.3, key logic 222 provides the session key to integrity logic 228, decryption logic 226 and encryption logic 224, all of circuitry 137.

In some examples, at 12.4, integrity logic 228 reads encrypted data with HMAC from input buffer(s) 231. For these examples, the data to read from input buffer(s) 231 can be identified in the work descriptor. For example, the work descriptor includes a memory address and/or one or more queue structures maintained in input buffer(s) 231 that included the encrypted data with its associated HMAC. The data, for example, can have been encrypted using an AES-XTS algorithm that needs an HMAC to verify integrity. In other examples, where an AES-GCM algorithm was used to encrypt the data, HMAC functionality is built in and the encrypted data would not be accompanied by an HMAC.

In some examples, at 12.5, integrity logic 228 is to verify the HMAC for the encrypted data. For these examples, integrity logic 228 uses the shared secret key and the encrypted data to generate an HMAC value and compare that generated HMAC value to the HMAC read from input buffer(s) 231 with the encrypted data. If the generated HMAC value matches the HMAC read from input buffer(s) 231, the integrity of the encrypted data is verified. If a match does not exist, integrity logic 228 notifies service 132 that verification has failed (e.g., the integrity of the encrypted data may have been compromised) and operations indicated in the work descriptor will be ceased.

In some examples, at 12.6, integrity logic 228 forwards the encrypted data to decryption logic based on the integrity of the encrypted data being verified based on the generated HMAC value matching the HMAC read from input buffer(s) 231.

According to some examples, at 12.7, decryption logic 226 uses the session key provided by key logic 222 to decrypt the encrypted data to generate clear text compressed data that also includes an appended CRC value. The clear text compressed data and the appended CRC value is at least temporarily stored to secure memory 225. Also, the CRC value is provided to integrity logic 228.

According to some examples, at 12.8, transformation logic 229 of circuitry 137 reads the clear text compressed data stored at secure memory 225, transforms the clear text compressed data based on what was indicated in the work descriptor (e.g., decompression), and stores the transformed data (e.g., decompressed data) to secure memory 225.

In some examples, at 12.9, integrity logic 228 reads the transformed (e.g., decompressed) data from secure memory 225.

In some examples, at 12.10, integrity logic 228 generates a CRC value based on the transformed (e.g., decompressed) data and compare the generated CRC value to the CRC value that was provided by decryption logic 226 to verify that the clear text data has not been altered or corrupted from its original state. For example, the transformed (e.g., decompressed) data, if verified will be lossless and not altered or corrupted due to bit errors generated when reading the encrypted data from the storage device or following compression transformations and/or encryption (e.g., described in flow 1000) of the data prior to being written to the storage device.

In some examples, at 12.11, encryption logic 224 reads or obtains the transformed data from secure memory 225.

According to some examples, at 12.12, encryption logic 224 encrypts the transformed data to generate encrypted data.

In some examples, at 12.13, encryption logic 224 provides the encrypted data to integrity logic 228.

According to some examples, at 12.14, integrity logic 228 uses the encrypted data to generate a new HMAC value for this encrypted data. For these examples, similar to 12.5, integrity logic 228 uses the shared secret key to generate this new HMAC value.

In some examples, at 12.15, integrity logic 228 causes the encrypted data with the new HMAC value to be sent to one or more output buffer(s) 233 at service server 110. Although not shown in FIG. 12, the encrypted data with the new HMAC value sent to output buffer(s) 233 can subsequently be sent to a TEE 116 at compute server 110. Read flow 1200 then comes to an end.

Figure 13:
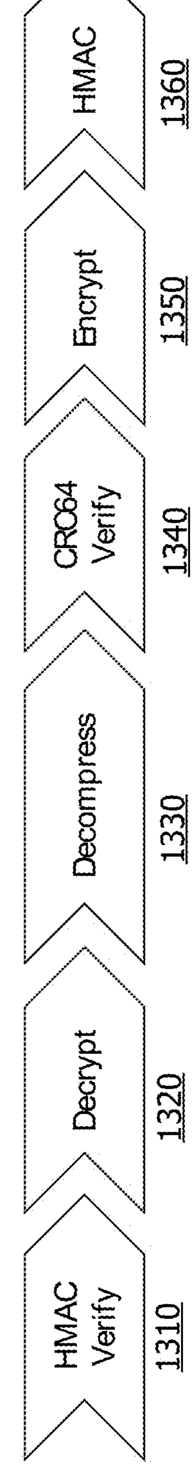
FIG. 13 illustrates an example accelerator read integrity scheme.

FIG. 13 illustrates an example accelerator read integrity scheme 1300. Accelerator read integrity scheme 1300 shown in FIG. 13 provides a high-level example of how logic and/or features of circuitry (e.g., circuitry 137) at an accelerator (e.g., accelerator 136) verifies integrity of encrypted data upon receiving or obtaining the encrypted data and to verify the integrity of the data following a decompression of previously compressed data (e.g., as described above for write flow 1000).

In some examples, at 1310, logic and/or features of the circuitry at the accelerator (e.g., integrity logic 228) verifies an HMAC included in the encrypted data. For example, similar to what was described above in read flow 1200, at 12.5.

According to some examples, at 1320, logic and/or features of the circuitry at the accelerator (e.g., decryption logic 226), decrypts encrypted compressed data that also includes a CRC-64 value. For example, similar to what was described above in read flow 1200, at 12.7.

In some examples, at 1330, logic and/or features of the circuitry at the accelerator (e.g., transformation logic 229), decompresses the compressed data that was decrypted. For example, similar to what was described above in read flow 1200, at 12.9 and 12.10.

According to some examples, at 1340, logic and/or features of the circuitry at the accelerator (e.g., integrity logic 228), generate a CRC-64 value using the decompressed data and compares the generated CRC-64 value to the CRC-64 included in the decrypted data (examples are not limited to CRC-64 values). A match of CRC-64 values verifies the accuracy of the decompression and decryption operations performed at 1320 and 1330 and also verifies that bit errors were not caused during the reading and/or writing of the encrypted data from/to a storage device.

In some examples, at 1350, logic and/or features of the circuitry at the accelerator (e.g., encryption logic 224), encrypts the decompressed data. For example, similar to what was described above in write flow 1000, at 10.12 and 10.13.

According to some examples, at 1360, logic and/or features of the circuitry at the accelerator (e.g., integrity logic 228), generates a new HMAC value for the encrypted data. For example, similar to what was described above in read flow 1200, at 12.14. Accelerator read integrity scheme 1300 then comes to an end.

FIG. 14 illustrates an example storage write integrity scheme 1410 and an example storage read integrity scheme 1420. Storage write flow integrity scheme 1410 and storage read integrity scheme 1420 shown in FIG. 14 provides a high-level example of how logic and/or features of circuitry (e.g., circuitry 117) of a TEE (e.g., TEE 116) at a compute server (e.g., compute server 110) can maintain data-integrity information for data written to or read from a storage device following possible transformations services (e.g., compression, de-duplication, decompression) by an accelerator (e.g., accelerator 136) at a service server (e.g., service server 130) coupled to a storage array (e.g., storage array 140) that includes the storage device.

According to some examples, at 1412 of storage write flow integrity scheme 1410, logic and/or features of the circuitry of the TEE (e.g., integrity logic 218), calculates and maintains a CRC/hash value of each data-block to be written to the storage device. CRC/hash values, for example, can be maintained in a Merkle tree like data structure. Then, at 1414, logic and/or features of the circuitry of the TEE (e.g., encryption logic 214), encrypts each data-block. In some examples, each data-block is encrypted along with its associated CRC/hash value. Also, at 1416, logic and/or features of the circuitry of the TEE (e.g., integrity logic 218) generates an HMAC value to identify whether the encrypted data is tampered with during transit to the storage device. For example, similar to what was described above in write flow 700, at 7.4. The HMAC value can be separately included with the encrypted data, for example, if an AES-XTS algorithm is used for the encryption. Alternatively, if an AES-GCM algorithm is used for encryption, then a separate HMAC value is not needed.

In some examples, at 1422 of storage read flow integrity scheme 1420, logic and/or features of the circuitry of the TEE (e.g., integrity logic 218) verifies an HMAC included with the encrypted data, for example, similar to what was described above in read flow 800, at 8.3. Then, at 1424, logic and/or features of the circuitry of the TEE (e.g., decryption logic 216), decrypts the encrypted data-block mentioned above for storage write flow integrity scheme 1410, at 1412. In some examples, along with the data-block, the CRC/hash value associated with the data-block is also decrypted. Also, at 1426, logic and/or features of the circuitry of the TEE (e.g., integrity logic 218), completes a hash verify operation by calculating the CRC/hash value for the decrypted data-block and comparing it with a CRC/hash value assigned to the data-block (e.g., maintained in a Merkle tree like data structure). In some examples, the calculated CRC/hash value is also compared with the CRC/hash value included with the decrypted data-block. A match will verify the integrity of the decrypted data-block.

Figure 15:
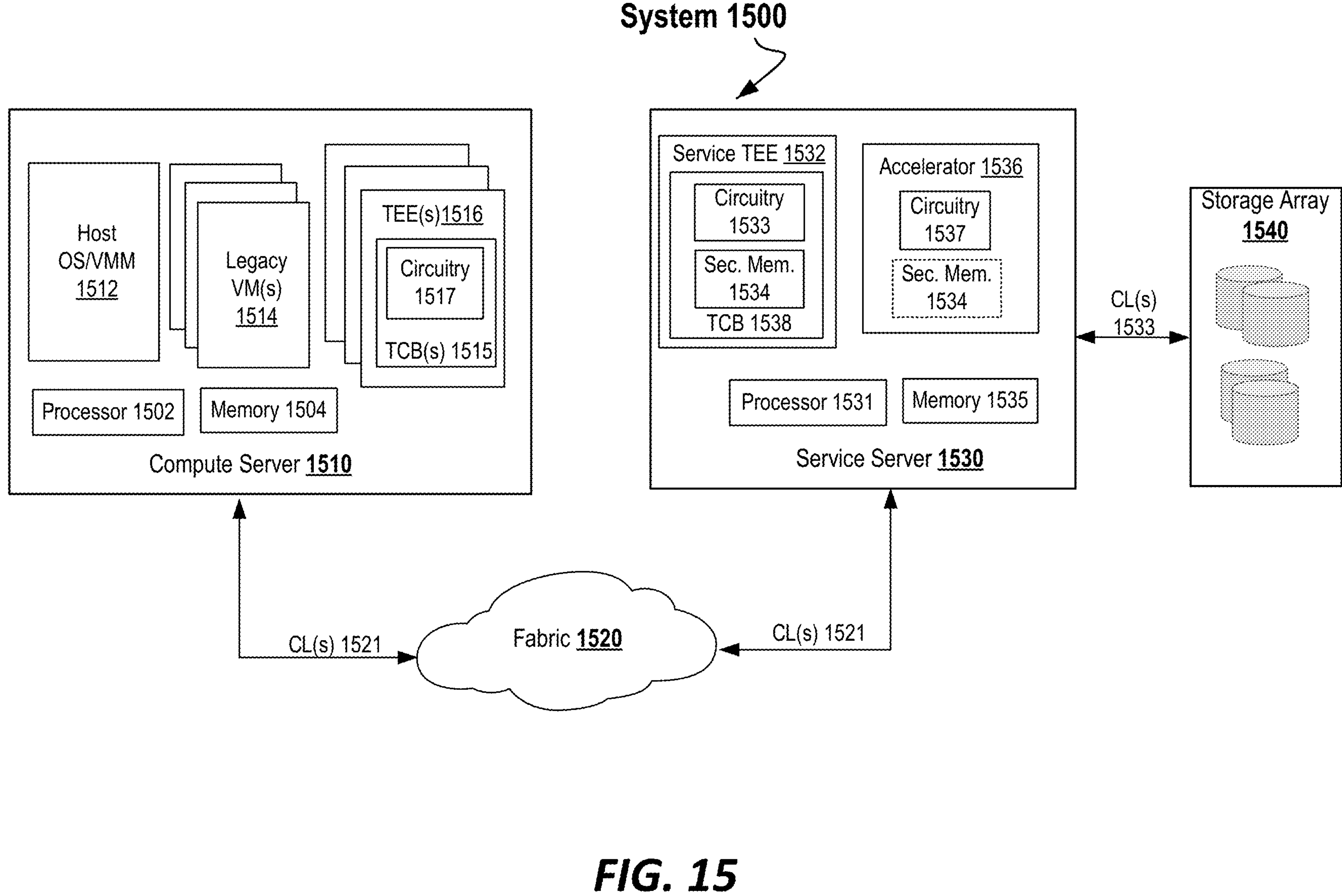
FIG. 15 illustrates an example second system.

FIG. 15 illustrates an example system 1500. In some examples, system 1500 is similar to system 100 shown in FIGS. 1 and 2 and can be included in and/or operate within a datacenter. As shown in FIG. 15, system 1500 includes a compute server 1510 communicatively coupled with a remotely located service server 1530 via one or more communication links (CL(s)) 1521 included in and/or routed through fabric 1520. Also, as shown in FIG. 15, service server 1530 can be communicatively coupled with a storage array 1540 via one or more CL(s) 1533.

According to some examples, as shown in FIG. 15, compute server 1510 includes a processor 1502, a memory 1504, a host OS/VMM 1512, one or more legacy VM(s) 1514 and one or more TEE(s) 1516. For these examples, legacy VM(s) 1514 represent tenant VMs hosted by compute server 1510 that are not configured to operate within a TEE. Meanwhile TEE(s) 1516 represent tenant VMs configured to operate in individual TEEs that run on compute server 1510. Each individual TEE of TEE(s) 1516 can have a TCB 1515 that includes hardware (e.g., processor core(s), memory, storage, communication interfaces, etc.), firmware, and/or software hosted by compute server 1510. For example, one or more cores of processor 1502 or at least a portion of memory 1504 can be included in TCB(s) 1515 as well as other hardware, firmware, and/or software (not shown in FIG. 15) that can be hosted by compute server 1510. Host OS/VMM 1512 and legacy VM(s) 1514 are not included in or are outside of TEE(s) 1516 and are deemed as untrusted in regard to confidential computing information that is being protected by TEE(s) 1516. TEE(s) 1516 can be arranged to operate according to Intel® TDX, Intel® SGX, AMD® Secure Encrypted Virtualization or ARM® TrustZone technology. Examples are not limited to these examples of operating environments or technologies for TEE(s) 1516, other types of trusted execution environments are contemplated.

In some examples, as shown in FIG. 15, service server 1530 includes a service TEE 1532 and an accelerator 1536. For these examples, service TEE 1532 and accelerator 136 are considered as remote in relation to TEE(s) 1516. As shown in FIG. 15, service TEE 1532 has a TCB 1538 that includes hardware (e.g., processor core(s), memory, storage, communication interfaces, etc.), firmware, and/or software hosted by service server 1530. A portion of the hardware included in TCB 1538 can be supported by a processor 1531 or a memory 1535. According to some examples, a portion of memory 1535 can be arranged as secure memory 1534 and included in TCB 1538. As described more below, to support storage service read/write flow integrity schemes, logic and/or features of circuitry 1537 at accelerator 1536 can have access secure memory 1534 in order to maintain data confidentiality. Similar to TEE(s) 116, service TEE

1532 can be arranged to operate according to Intel® TDX, Intel® SGX, AMD® Secure Encrypted Virtualization or ARM® TrustZone technology.

According to some examples, service TEE 1532 and/or accelerator 1536 can be arranged to facilitate/accelerate services requested by TEE(s) 1516 to service TEE 1532 and/or accelerator 1536. In one example, a requested service can be a storage service that provides access to storage array 1540 by TEE(s) 1516 to read data from or write data to one or more memory devices included in storage array 1540. At least some elements or components utilized by TEE(s) 1516 to access storage array 1540 to include but not limited to, host OS/VMM 1512, fabric 1520, and storage array 1540 are considered as untrusted and confidential data associated with TEE(s) 1516's access to storage array 1540 needs to be encrypted as it passes to/from storage array 1540 in order to maintain confidentiality.

As described more below, circuitry 1517 of TEE(s) 1516 included in TCB(s) 1515, circuitry 1533 of service TEE 1532 included in TCB 1538, and circuitry 1537 at accelerator 1536 can be configured to establish a trusted enclave/hardened-logic at both service TEE 1532 and accelerator 1536 with TEE(s) 1516. The trusted enclave/hardened-logic at service TEE 1532 or accelerator 1536, once established, enables service TEE 1532 and/or accelerator 1536 to decrypt/encrypt data, securely perform one or more operations on the decrypted data, and then re-encrypt the data responsive to work requests from TEE(s) 1516. In other words, the established enclave/hardened-logic at service TEE 1532 and accelerator 1536 ensures that the encrypted data is received by service TEE 1532 or accelerator 1536 (either from TEE(s) 1516 or storage array 1540), and the encrypted data leaves service TEE 1532 or accelerator 1536 and as a result, all processing/optimizations on the data are done securely by logic and/or features of circuitry 1533 of service TEE 1532 or circuitry 1537 at accelerator 1536 while maintaining confidentiality of the data.

In some examples, similar to accelerator 136 shown in FIGS. 1-2, accelerator 1536 can be configured as various types of accelerators to include, but not limited to, an IAA, an Intel® DSA, or an Intel® QAT accelerator.

According to some examples, circuitry 1517 of TEE(s) 1516 can include a separate FPGA, ASIC, or one or more cores of a general purpose CPU hosted by and/or resident on compute server 1510.

In some examples, circuitry 1533 of service TEE 1532 can include an FPGA, ASIC, or one or more cores of a general purpose CPU hosted by and/or resident on service server 1530.

According to some examples, circuitry 137 at accelerator 136 can include an FPGA, ASIC or one or more cores of a CPU resident on accelerator 136 and hosted by service server 130.

In some examples, storage array 1540 can include the types of volatile or non-volatile memory mentioned above for storage array 140 shown in FIGS. 1-2. Also, fabric 1520 can operate according to the one or more networking and/or communication technologies mentioned above for fabric 120 shown in FIGS. 1-2.

Figure 16:
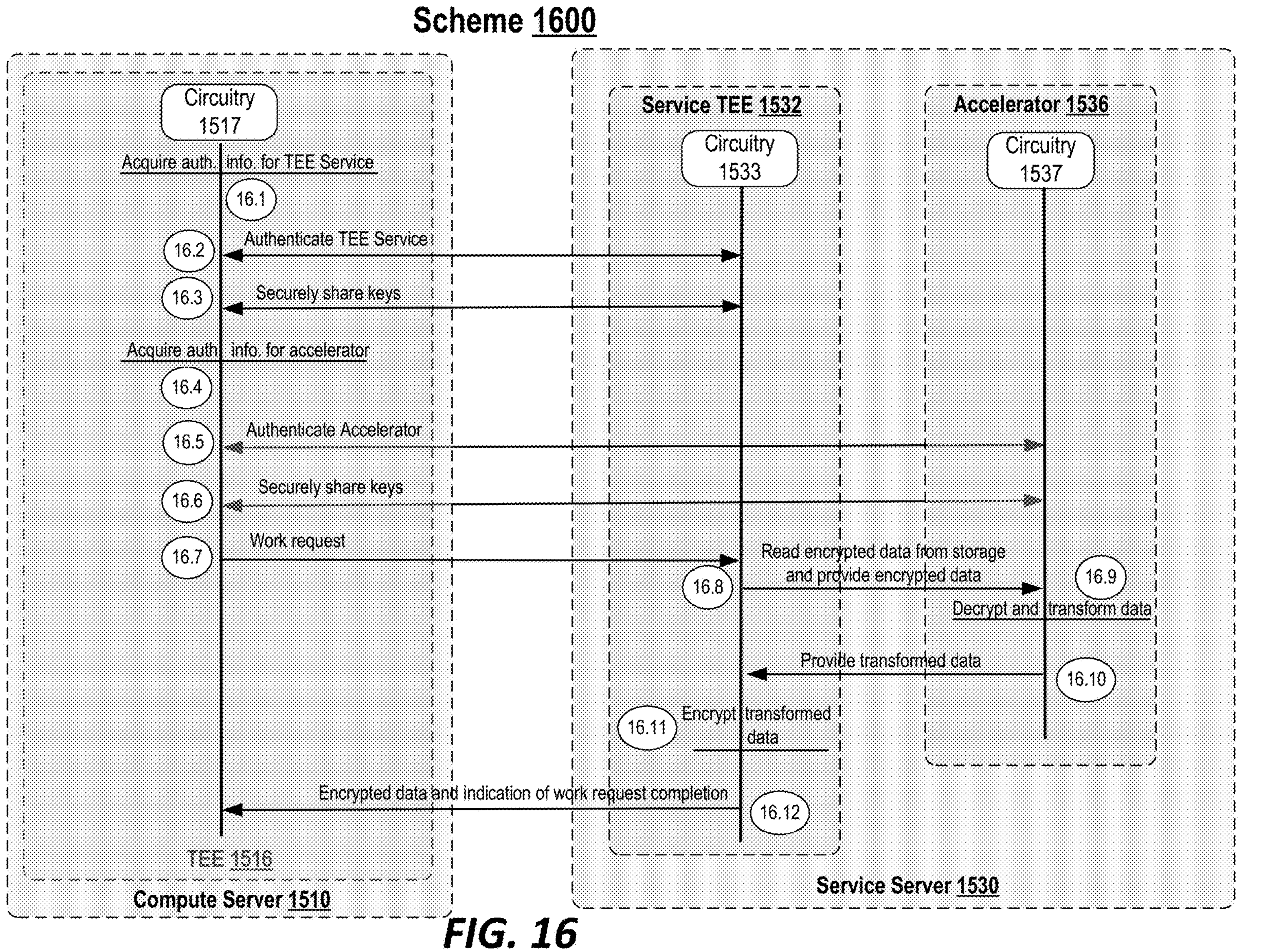
FIG. 16 illustrates an example scheme to authenticate a service TEE and an accelerator and process a work request sent by a TEE at a compute server.

FIG. 16 illustrates an example scheme 1600. In some examples, scheme 1600 depicts a way to establish secure sessions between TEE 1516 at compute server 1510 with service TEE 1532 and accelerator 1536 at service server 1530 and place a work request to accelerator 1536 for writing data to storage. For these examples, as shown in FIG. 16, circuitry 1517 of TEE 1516, circuitry 1533 of service TEE 1532, or circuitry 1537 of accelerator 1536 are utilized to establish secure sessions, place work requests and complete those work requests within a trusted enclave. Circuitry 1517, circuitry 1533 and circuitry 1537 can include some or all of the logic and/or features for respective circuitry 117 and 137 as shown in or described above for FIGS. 2-15 to implement at least portions of scheme 1600. These separate logic and/or features are not described for scheme 1600 for simplicity purposes.

According to some examples, at 16.1, circuitry 1517 can implement operations according to the SPDM specification to acquire authentication information from/about service TEE 1532. For these examples, use of an SPDM messaging protocol according to the SPDM specification can include acquiring certificates and measurements associated with service TEE 1532.

In some examples, at 16.2, circuitry 1517 of TEE 1516 works in cooperation with circuitry 1533 of service TEE 1532. For these examples, circuitry 1517 implements a request-response messaging model described in the SPDM specification that includes a message exchange using an SPDM messaging protocol, for example, where each SPDM request message shall be responded to with an SPDM response message. For these examples, a similar process as described above for FIG. 3 for authenticating accelerator 136 is implemented to authenticate the identity of service TEE 1532.

According to some examples, at 16.3, following authentication of service TEE 1532 by circuitry 1517 of TEE 1516, service TEE 1532 is deemed as trusted and is brought with the TCB of TEE 1516 and keys can be securely shared. For these examples, securely sharing keys includes circuitry 1517 causing a key table to be programmed at service TEE 1532 similar to what is mentioned above for schemes 300 or 500 shown in FIGS. 3 and 5 for programing a key table to accelerator 136.

In some examples, at 16.4, circuitry 1517 implements operations according to the SPDM specification to acquire authentication information from/about accelerator 1536. For these examples, use of an SPDM messaging protocol according to the SPDM specification can include acquiring certificates and measurements associated with accelerator 1536.

According to some examples, at 16.5, circuitry 1517 of TEE 1516 works in cooperation with circuitry 1536 of accelerator 1536. For these examples, circuitry 1517 implements a request-response messaging model described in the SPDM specification that includes a message exchange using an SPDM messaging protocol, for example, where each SPDM request message shall be responded to with an SPDM response message. For these examples, a similar process as described above for FIG. 3 for authenticating accelerator 136 is implemented to authenticate the identity of accelerator 1536.

In some examples, at 16.6, following authentication of accelerator 1536 by circuitry 1517 of TEE 1516, accelerator 1536 is deemed as trusted and is brought with the TCB of TEE 1516 and keys can be securely shared. For these examples, securely sharing keys includes circuitry 1517 causing a key table to be programmed at accelerator 1536 similar to what is mentioned above for schemes 300 or 500 shown in FIGS. 3 and 5 for programing a key table to accelerator 136.

According to some examples, at 16.7, circuitry 1517 sends a work request to service TEE 1532. For these examples, the work request can be for accelerator 1536 to perform a transformation on encrypted data read from a storage device (e.g., included in storage array 1540). The work request, for example, can include a work descriptor and/or information included in the work request that is used by service TEE 1532 to generate a work descriptor for accelerator 1536 to use to determine what session key to use to decrypt the encrypted data read from the storage device.

In some examples, at 16.8, circuitry 1533 of service TEE 1532 reads encrypted data from the storage device and provide the encrypted data to circuitry 1537 of accelerator 1536. For these examples, circuitry 1533 can also include a work descriptor that includes information to indicate what transformation is requested (e.g., compression, decompression, re-compression, de-duplication) and information to indicate what session key to use to decrypt the encrypted data.

According to some examples, at 16.9, circuitry 1537 at accelerator 1536 decrypts and transforms data. For these examples, similar operations are implemented as described above for read flow 1200 shown in FIG. 12 for circuitry 1537 to decrypt and then transform the data.

In some examples, at 16.10, circuitry 1537 at accelerator 1536 provides the transformed data to circuitry 1533 of service TEE 1532.

According to some examples, at 16.11, circuitry 1537 encrypts the transformed data. For these examples, similar operations are implemented as described above for read flow 1200 shown in FIG. 12 for circuitry 1533 to encrypt the transformed data and provide the encrypted data.

In some examples, at 16.12, circuitry 1533 of service TEE 1532 sends encrypted data along with an indication that the work request has been completed to circuitry 1537 at TEE 1516. Scheme 1600 then comes to an end.

Figure 17:
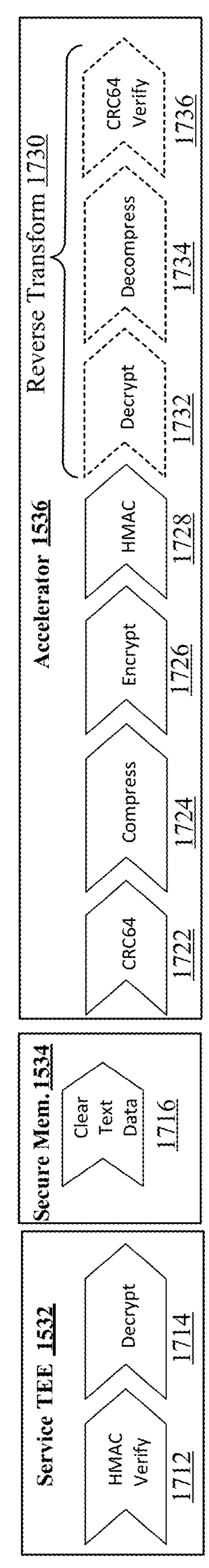
FIG. 17 illustrates an example storage service write flow integrity scheme.

FIG. 17 illustrates an example storage service write flow integrity scheme 1700. Storage service write flow integrity scheme 1700 shown in FIG. 17 provides a high-level example of how circuitry (e.g., circuitry 1533) of a service TEE (e.g., service TEE 1532) and circuitry (e.g., circuitry 1537) at an accelerator (e.g., accelerator 1536) collaboratively work to verify integrity of encrypted data upon receiving or obtaining the encrypted data, decrypt the data and take additional steps to protect re-encrypted data following any transformation of the data and to ensure that transformation of the data is lossless via a reverse transform process.

In some examples, at 1712, circuitry 1533 of TEE service 1532 verifies an HMAC included in the encrypted data. For example, similar to how an HMAC can be verified as was described above in write flow 1000, at 10.5. However, different from write flow 1000, the verification of the HMAC can be performed by service TEE 1532 as service TEE 1532 is part of a trusted enclave that provided access to secret keys to generate HMAC values in order to verify the HMAC included with the encrypted data.

According to some examples, at 1714, circuitry 1533 of TEE service 1532 decrypts the encrypted data. As mentioned above, TEE service 1532 is in part of the trusted enclave and will have an ability to determine what session key to use to decrypt the encrypted data.

In some examples, at 1716, circuitry 1533 of TEE service 1532 stores the decrypted data as clear text data in secure memory 1534 with a work descriptor that indicates that a compression transformation and a reverse transformation is requested to verify the integrity/lossless character of the compression and encryption of the transformed data. For these examples, as mentioned above and shown in FIG. 15, secure memory 1534 are included in TCB 1538 of service TEE 1532.

In some examples, at 1722, circuitry 1537 at accelerator 1536 obtains the clear text data and the work descriptor from secure memory 1534 and generates a CRC-64 value for the decrypted data.

According to some examples, at 1724, circuitry 1537 at accelerator 1536 compresses the decrypted data to transform the data that was decrypted.

In some examples, at 1726, circuitry 1537 at accelerator 1536 encrypts the transformed/compressed data. For these examples, the CRC-64 value generated at 1722 is included with the transformed/compressed data (examples are not limited to CRC-64 values). In some examples, the same session used by service TEE 1532 to decrypt the data as mentioned above at 1714 is used to encrypt the transformed/compressed data. In other examples, a different key can be used. The different key, for example, can be a storage volume key that is arranged to be used for transformed/compressed data to be stored to a storage volume.

According to some examples, at 1728, circuitry 1537 at accelerator 1536 generates a new HMAC value for the encrypted data. For example, similar to what was described above in write flow 1000, at 10.15.

In some examples, as shown in FIG. 17, storage service write flow integrity scheme 1700 can have a reverse transform 1730 that includes circuitry 1537 at accelerator 1536 to implement additional operations to verify an accuracy of the transformation/compression of the data performed at 1724 and the encryption performed at 1726. For these examples, at 1732, circuitry 1537 at the accelerator 1536 decrypts the encrypted data that results in the compressed data and its accompanied CRC-64 value. Then, at 1734, circuitry 1537 at accelerator 1536 decompresses the compressed data. Then, at 1736, circuitry 1537 at accelerator 1536 generate a CRC-64 value using the decompressed data and compares the generated CRC-64 value to the CRC-64 included in the decrypted data. A match of CRC-64 values verifies the accuracy of the compression and encryption operations performed at 1724 and 1726. Storage service write integrity scheme 1700 then comes to an end. A non-match of CRC-64 values indicates that either the compression or the encryption of data could have corrupted the data and remedial actions may need to be taken by the accelerator.

Figure 18:
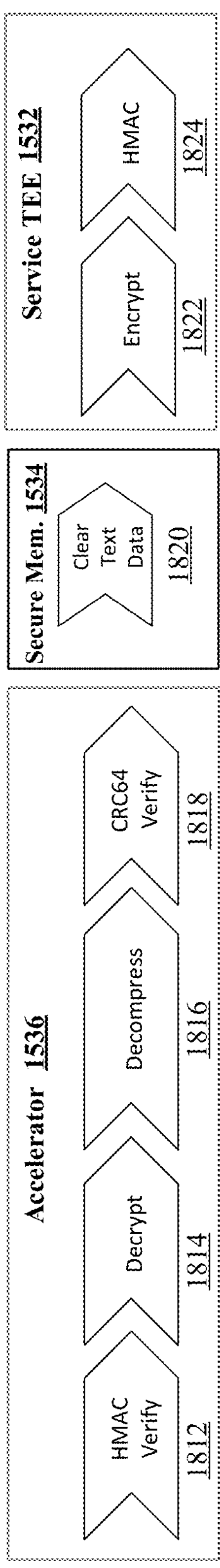
FIG. 18 illustrate an example storage service read flow integrity scheme.

FIG. 18 illustrates an example storage service read flow integrity scheme 1800. Storage service read flow integrity scheme 1800 shown in FIG. 18 provides a high-level example of how circuitry (e.g., circuitry 1533) of a service TEE (e.g., service TEE 1532) and circuitry (e.g., circuitry 1537) at an accelerator (e.g., accelerator 1536) collaboratively work to verify integrity of encrypted data upon receiving or obtaining the encrypted data and to verify the integrity of the data following a decompression of previously compressed data.

In some examples, at 1812, circuitry 1537 at accelerator 1536 verifies an HMAC included with the encrypted data. For example, similar to how an HMAC can be verified as was described above in read flow 1200, at 12.5.

According to some examples, at 1814, circuitry 1537 at accelerator 1536 decrypts encrypted compressed data that also includes a CRC-64 value. For example, similar to what was described above in read flow 1200, at 12.7.

According to some examples, at 1816, circuitry 1537 at accelerator 1536 decompresses the compressed data that was decrypted. For example, similar to what was described above in read flow 1200, at 12.9 and 12.10.

In some examples, at 1818, circuitry 1537 at accelerator 1536 generates a CRC-64 value using the decompressed data and compares the generated CRC-64 value to the CRC-64 included in the decrypted data (examples are not limited to CRC-64 values). A match of CRC-64 values verifies the accuracy of the decompression and decryption operations performed at 1814 and 1816 and also verifies that bit errors were not caused during the reading and/or writing of the encrypted data from/to a storage device.

According to some examples, at 1820, accelerator 1536 causes the decompressed data to be stored as clear text data in secure memory 1534.

According to some examples, at 1822, circuitry 1533 of service TEE 1532 obtains the decompressed data from secure memory 1534 and encrypts the decompressed data. For example, similar to what was described above in read flow 1200, at 12.12 and 12.13.

In some examples, at 1824, circuitry 1533 of service TEE 1532 generates a new HMAC value for the encrypted data. For example, similar to what was described above in flow 1200, at 12.14. Storage service read integrity scheme 1800 then comes to an end.

Figure 19:
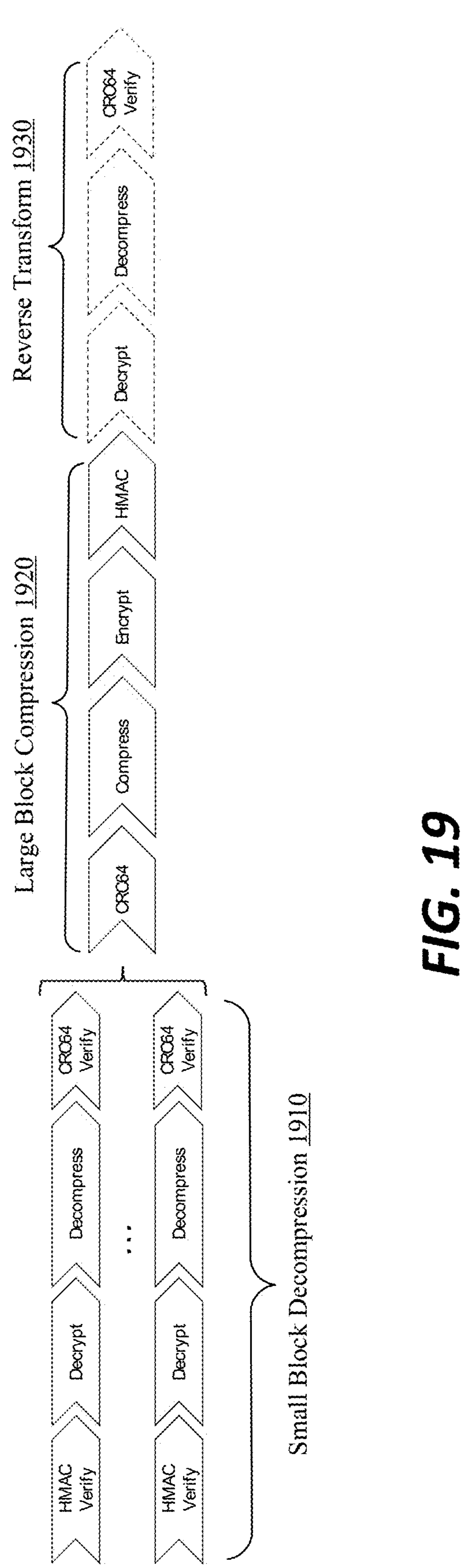
FIG. 19 illustrates an example re-compression scheme.

FIG. 19 illustrates an example re-compression scheme 1900. In some examples, circuitry 1533 of TEE service 1532 or circuitry 1537 of accelerator 1536 is capable of separately or cooperatively implementing re-compression scheme 1900 responsive to a work request received from TEE 1516. The work request can indicate that a plurality of encrypted, small, compressed data-blocks are to decrypted as shown by small block compression 1910, decompressed, combined, compressed in a larger compressed data block that is then encrypted as shown by large block compression 1920 and then a reverse transform is performed as shown by reverse transform 1930 to verify an accuracy of the transformation/compression of the data. The various actions taken at 1910, 1920 or 1930 can substantially follow what was described above for the various read/write flow integrity schemes shown in FIG. 11, 13 or 18, with the exception of combining smaller blocks of decompressed data into larger blocks to obtain a relatively more efficient compression ratio.

Figure 20:
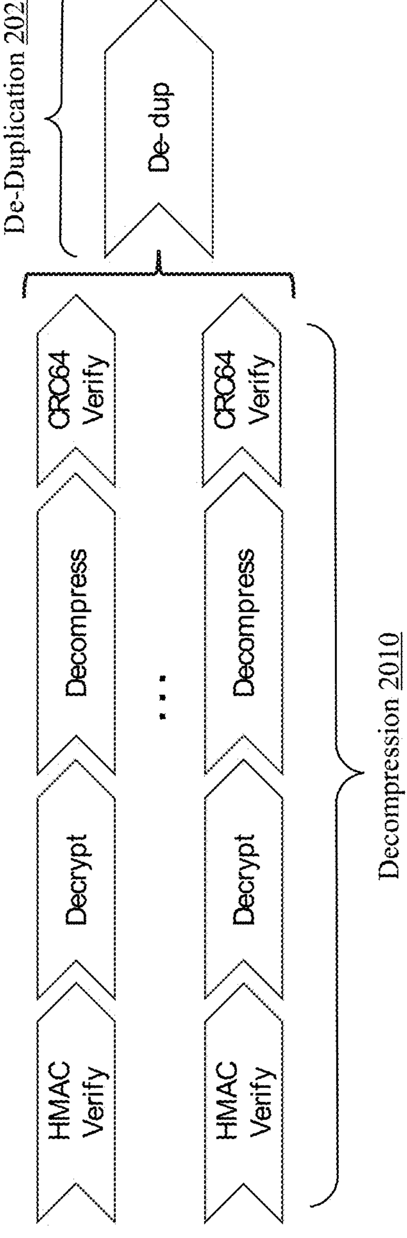
FIG. 20 illustrates an example de-duplication scheme.

FIG. 20 illustrates an example de-duplication scheme 2000. In some examples, circuitry 1533 of TEE service 1532 or circuitry 1537 of accelerator 1536 is capable of separately or cooperatively implementing de-duplication scheme 2000 responsive to a work request received from TEE 1516. The work request can indicate that a plurality of encrypted, compressed data-blocks are to decrypted and decompressed as shown by decompression 2010 and at de-duplication 2020 any duplicate data-blocks are identified. For these examples, if the work request is for a write operation a single copy of a duplicated data-block can be compressed and encrypted and stored to a storage device (e.g., with or without a reverse transform). If the work request is for a read operation a single copy of a duplicated data-block is encrypted and that encrypted data-block is what is sent to TEE 1516. The various actions taken at 2010 can substantially follow what was described above for the read flow integrity schemes shown in FIG. 13 or 18.

FIG. 21 illustrates an example logic flow 2100. Logic flow 2100 is representative of the operations implemented by logic and/or features of a circuitry of a TEE at a compute server. For example, logic and/or features of circuitry 117 of TEE 116 as shown in FIGS. 1-2 and described in the various flows and schemes mentioned above.

In some examples, as shown in FIG. 21, logic flow 2100 at block 2110 authenticates an accelerator at a service server that is to be coupled with the compute server via a communication link routed through a fabric. For example, authenticate logic 210 of circuitry 117 authenticates accelerator 136 via establishment of a secure communication session with accelerator 136 according to the SPDM specification.

According to some examples, logic flow 2100 at 2120 causes a key table to be programmed and maintained at the accelerator, the key table for use by the accelerator to identify at least one session key to use to decrypt encrypted data sent from or destined to the TEE. For example, key programming logic of circuitry 117 causes the key table to be programmed and maintained at secure memory 225 of accelerator 136. The key table can include session keys as described for example key table 400 shown in FIG. 4 or can include wrapping keys as described for example key table 600 as shown in FIG. 6.

In some examples, logic flow 2100 at 2130 generates a work request for the accelerator to perform a transformation operation on data included in encrypted data, the work request to include information for the accelerator to identify a session key to use to decrypt the encrypted data based on the programmed key table, the work request to indicate that transformed data is to be encrypted using the session key and sent towards a destination indicated in the work request. For example, circuitry 117 generates a work request for accelerator 136 to perform a transformation operation and include information to identify a session key to use to decrypt and then encrypt transformed data based on the programmed key table. The information can include an index value that points to a key table that includes either session keys or wrapping keys. If session keys are in the programmed key table, then the indexed session key is used to decrypt the encrypted data. If wrapping keys are in the programmed key table, then the wrapping key is used to decrypt an encrypted session key that, in one example, is included in a work descriptor for the work request.

According to some examples, logic flow 2100 at block 2140 causes the work request to be sent to the accelerator. For example, circuitry 117 can cause the work request to be sent via CL(s) 121 routed through fabric 120 to reach accelerator 136 that is at or with service server 130.

The logic flow shown in FIG. 21 can be representative of example methodologies for performing novel aspects described in this disclosure. While, for purposes of simplicity of explanation, the one or more methodologies shown herein are shown and described as a series of acts, those skilled in the art will understand and appreciate that the methodologies are not limited by the order of acts. Some acts can, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology can be required for a novel implementation.

A logic flow can be implemented in software, firmware, and/or hardware. In software and firmware embodiments, a software or logic flow can be implemented by computer executable instructions stored on at least one non-transitory computer readable medium or machine readable medium, such as an optical, magnetic or semiconductor storage. The embodiments are not limited in this context.

Figure 22:
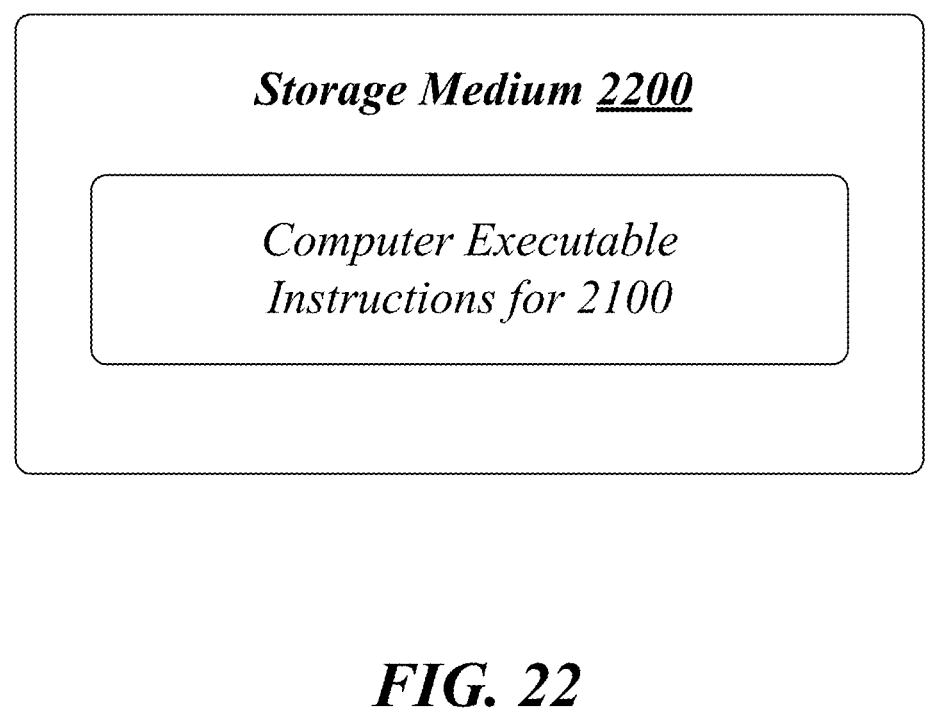

FIG. 22 illustrates an example of a storage medium. As shown in FIG. 22, the storage medium includes a storage medium 2200. The storage medium 2200 can comprise an article of manufacture. In some examples, storage medium 2200 can include any non-transitory computer readable medium or machine readable medium, such as an optical, magnetic or semiconductor storage. Storage medium 2200 can store various types of computer executable instructions, such as instructions to implement logic flow 2100. Examples of a computer readable or machine readable storage medium can include any tangible media capable of storing electronic data, including volatile memory or non-volatile memory, removable or non-removable memory, erasable or non-erasable memory, writeable or re-writeable memory, and so forth. Examples of computer executable instructions can include any suitable type of code, such as source code, compiled code, interpreted code, executable code, static code, dynamic code, object-oriented code, visual code, and the like. The examples are not limited in this context.

Figure 23:
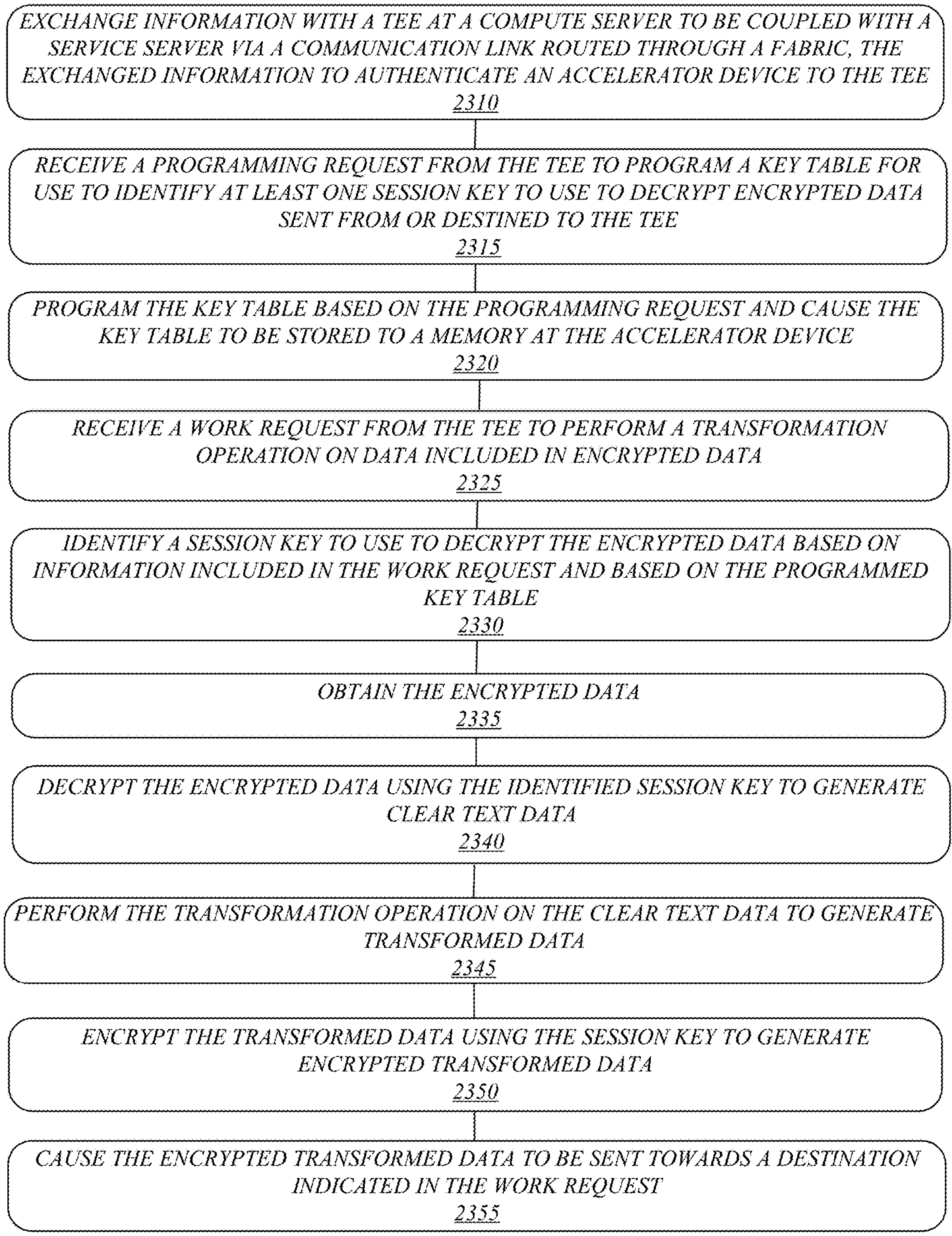
FIG. 23 illustrates an example second logic flow.

FIG. 23 illustrates an example logic flow 2300. Logic flow 2300 can be representative of the operations implemented by logic and/or features of a circuitry at an accelerator device coupled with a service server. For example, logic and/or features of circuitry 137 at accelerator 136 coupled with service server 130 as shown in FIGS. 1-2 and described in the various flows and schemes mentioned above.

In some examples, as shown in FIG. 23, logic flow 2300 at block 2310 can exchange information with a TEE at a compute server to be coupled with a service server via a communication link routed through a fabric, the exchanged information to authenticate an accelerator device to the TEE. For example, authenticate logic 220 of circuitry 137 at accelerator 136 can exchange information with TEE 116 to enable TEE 116 to authenticate accelerator 136 via establishment of a secure communication session according to the SPDM specification.

According to some examples, logic flow 2300 at 2315 can receive a programming request from the TEE to program a key table for use to identify at least one session key to use to decrypt encrypted data sent from or destined to the TEE. For example, key programming logic 212 of circuitry 117 can send a programming request to cause the key table to be programmed and maintained at secure memory 225 of accelerator 136.

In some examples, logic flow 2300 at 2320 can program the key table based on the programming request and cause the key table to be stored to a memory at the accelerator device. For example, key logic 222 of circuitry 135 programs the key table and maintains the programmed key table at secure memory 225 of accelerator 136. The programmed key table can include session keys as described for example key table 400 shown in FIG. 4 or can include wrapping keys as described for example key table 600 as shown in FIG. 6.

According to some examples, logic flow 2300 at 2325 can receive a work request from the TEE to perform a transformation operation on data included in encrypted data. For example, accelerator 136 receives the work request.

In some examples, logic flow 2300 at 2330 can identify a session key to use to decrypt the encrypted data based on information included in the work request and based on the programmed key table. For example, the work request can include information for key logic 222 of circuitry 137 to identify a session key to use to decrypt and then encrypt transformed data based on the programmed key table. The information can include an index value that points to a key table that includes either session keys or wrapping keys. If session keys are in the programmed key table, then the indexed session key is used to decrypt the encrypted data. If wrapping keys are in the programmed key table, then the wrapping key is used to decrypt an encrypted session key that was caused to be encrypted with the wrapping key by circuitry 117 of TEE 116 (e.g., using key server 240).

According to some examples, logic flow 2300 at block 2335 can obtain the encrypted data. For example, accelerator 136 can obtain the encrypted data from input buffer(s) 231 at service server 130.

In some examples, logic flow 2300 at block 2340 can decrypt the encrypted data using the identified session key to generate clear text data. For example, decryption logic of circuitry 137 decrypts the encrypted data using the identified session key.

According to some examples, logic flow 2300 at block 2345 can perform the transformation operation on the clear text data to generate transformed data. For example, transformation logic 229 can perform the transformation operation (e.g., compression, decompression, de-duplication).

In some examples, logic flow 2300 at block 2350 can encrypt the transformed data using the session key to generate encrypted transformed data. For example, encryption logic 224 of circuitry 137 can encrypt the transformed data According to some examples, logic flow 2300 at block 2355 can cause the encrypted transformed data to be sent towards a destination indicated in the work request. For example, circuitry 137 can cause the encrypted transformed data to be sent to output buffer(s) 233 at service server 130 to cause the encrypted transformed data to be sent towards the destination indicated in the work request.

The logic flow shown in FIG. 23 can be representative of example methodologies for performing novel aspects described in this disclosure. While, for purposes of simplicity of explanation, the one or more methodologies shown herein are shown and described as a series of acts, those skilled in the art will understand and appreciate that the methodologies are not limited by the order of acts. Some acts can, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology can be required for a novel implementation.

A logic flow can be implemented in software, firmware, and/or hardware. In software and firmware embodiments, a software or logic flow can be implemented by computer executable instructions stored on at least one non-transitory computer readable medium or machine readable medium, such as an optical, magnetic or semiconductor storage. The embodiments are not limited in this context.

Figure 24:
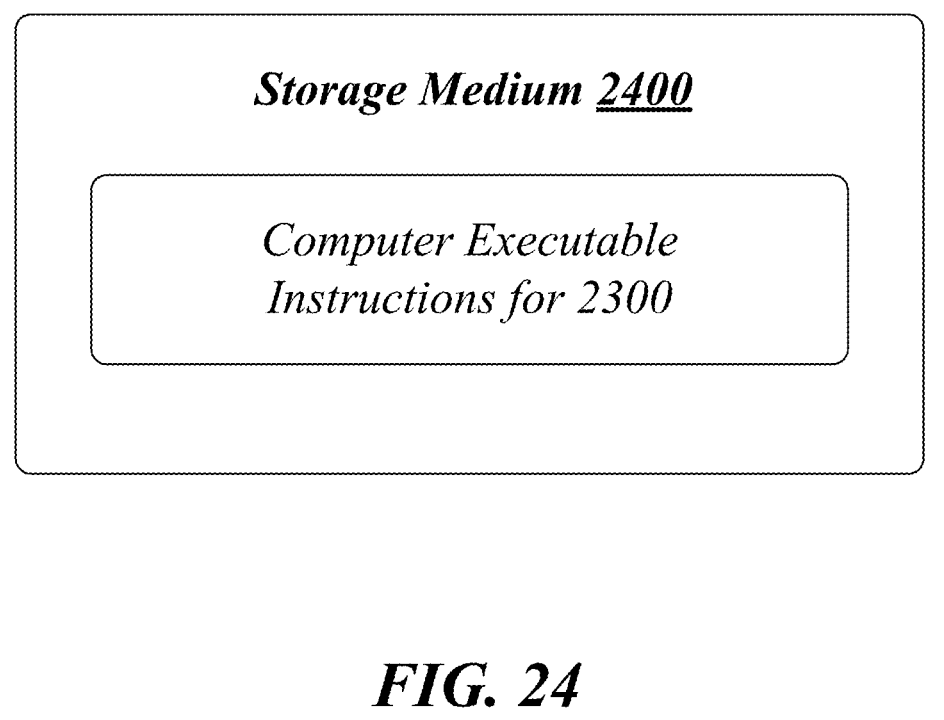

FIG. 24 illustrates an example of a storage medium. As shown in FIG. 24, the storage medium includes a storage medium 2400. The storage medium 2400 can comprise an article of manufacture. In some examples, storage medium 2400 can include any non-transitory computer readable medium or machine readable medium, such as an optical, magnetic or semiconductor storage. Storage medium 2400 can store various types of computer executable instructions, such as instructions to implement logic flow 2300. Examples of a computer readable or machine readable storage medium can include any tangible media capable of storing electronic data, including volatile memory or non-volatile memory, removable or non-removable memory, erasable or non-erasable memory, writeable or re-writeable memory, and so forth. Examples of computer executable instructions can include any suitable type of code, such as source code, compiled code, interpreted code, executable code, static code, dynamic code, object-oriented code, visual code, and the like. The examples are not limited in this context.

The following examples pertain to additional examples of technologies disclosed herein.

Example 1. An example apparatus to be configured at a compute server, the apparatus to include a processor, a memory, and circuitry of a TEE. The TEE to include a trusted computing base that includes at least one core of the processor and at least a portion of the memory. For this example apparatus, the circuitry is configured to authenticate an accelerator at a service server that is to be coupled with the compute server via a communication link routed through a fabric. The circuitry is also configured to cause a key table to be programmed and maintained at the accelerator. The key table is for use by the accelerator to identify at least one session key to use to decrypt encrypted data sent from or destined to the TEE.

Example 2. The apparatus of example 1, the circuitry is also configured to generate a work request for the accelerator to perform a transformation operation on data included in encrypted data. The work request is to include information for the accelerator to identify a session key to use to decrypt the encrypted data based on the programmed key table. The work request to indicate that transformed data is to be encrypted using the session key and sent towards a destination indicated in the work request. The circuitry is also configured to cause the work request to be sent to the accelerator.

Example 3. The apparatus of example 2, the destination indicated in the work request is a storage device coupled with the service server. The transformation operation can include compressing data included in the decrypted data, de-duplicating data included in the decrypted data or re-compressing data included in the decrypted data.

Example 4. The apparatus of example 3, the transformation operation includes compressing data included in the decrypted data. The decrypted data is to include one or more data-blocks, each data-block having a hash value generated by the circuitry, respective generated hash values to be used to verify an integrity of each data-block.

Example 5. The apparatus of example 2, the destination indicated in the work request is the TEE. The transformation operation can include decompressing data included in the decrypted data or de-duplicating data included in the decrypted data.

Example 6. The apparatus of example 5, the transformation operation includes decompressing data included in the decrypted data. The decrypted data includes one or more data-blocks, each data-block having a hash value generated by the circuitry, respective generated hash values to be used to verify an integrity of each data-block.

Example 7. The apparatus of example 1, the circuitry can be configured to authenticate the accelerator via establishment of a secure communication session with the accelerator according to an SPDM specification.

Example 8. The apparatus of example 1, the circuitry of the TEE is a core of the processor, a field programmable gate array, or an application specific integrated circuit.

Example 9. An example method includes authenticating, by circuitry of a TEE at a compute server, an accelerator at a service server that is to be coupled with the compute server via a communication link routed through a fabric. The method also includes causing, by the circuitry of the TEE, a key table to be programmed and maintained at the accelerator, the key table for use by the accelerator to identify at least one session key to use to decrypt encrypted data sent from or destined to the TEE.

Example 10. The method of example 9 also include generating by the circuitry of the TEE, a work request for the accelerator to perform a transformation operation on data included in encrypted data. The work request is to include information for the accelerator to identify a session key to use to decrypt the encrypted data based on the programmed key table. The work request is to indicate that transformed data is to be encrypted using the session key and sent towards a destination indicated in the work request. The method may also include causing, by the circuitry of the TEE, the work request to be sent to the accelerator.

Example 11. The method of example 10, the destination indicated in the work request is a storage device coupled with the service server. The transformation operation can include compressing data included in the decrypted data, de-duplicating data included in the decrypted data or re-compressing data included in the decrypted data.

Example 12. The method of example 11, the transformation operation includes compressing data included in the decrypted data. The decrypted data is to include one or more data-blocks, each data-block having a hash value generated by the circuitry of the TEE, respective generated hash values to be used to verify an integrity of each data-block Example 13. The method of example 10, the destination indicated in work request is the TEE. The transformation operation includes decompressing data included in the decrypted data or de-duplicating data included in the decrypted data.

Example 14. The method of example 13, the transformation operation includes decompressing data included in the decrypted data. The decrypted data includes one or more data-blocks, each data-block having a hash value generated by the circuitry of the TEE, respective generated hash values to be used to verify an integrity of each data-block.

Example 15. The method of example 9, authenticating the accelerator is via establishment of a secure communication session with the accelerator according to an SPDM specification.

Example 16. An example at least one machine readable medium includes a plurality of instructions that in response to being executed by circuitry of a TEE at a compute server, cause the circuitry to carry out a method according to any one of examples 9 to 15.

Example 17. An example apparatus includes means for performing the methods of any one of examples 9 to 15.

Example 18. An example at least one non-transitory computer-readable storage medium includes a plurality of instructions, that when executed by circuitry of a TEE at a compute server, cause the circuitry to authenticate an accelerator at a service server that is to be coupled with the compute server via a communication link routed through a fabric. The instructions can also cause the circuitry of a TEE to cause a key table to be programmed and maintained at the accelerator. The key table is for use by the accelerator to identify at least one session key to use to decrypt encrypted data sent from or destined to the TEE.

Example 19. The at least one non-transitory computer-readable storage medium of example 18, the instructions can further cause the circuitry to generate a work request for the accelerator to perform a transformation operation on data included in encrypted data. The work request to include information for the accelerator to identify a session key to use to decrypt the encrypted data based on the programmed key table. The work request to indicate that transformed data is to be encrypted using the session key and sent towards a destination indicated in the work request. The instructions can also cause the circuitry of a TEE to cause the work request to be sent to the accelerator.

Example 20. The at least one non-transitory computer-readable storage medium of example 19, the destination indicated in the work request is a storage device coupled with the service server. The transformation operation can include compressing data included in the decrypted data, de-duplicating data included in the decrypted data or re-compressing data included in the decrypted data.

Example 21. The at least one non-transitory computer-readable storage medium of example 19, the destination indicated in work request is the TEE. The transformation operation includes decompressing data included in the decrypted data or de-duplicating data included in the decrypted data.

Example 22. The at least one non-transitory computer-readable storage medium of example 18, authenticating the accelerator is via establishment of a secure communication session with the accelerator according to an SPDM specification.

Example 23. An example accelerator device is configured to be coupled with a service server. The accelerator device includes a memory and circuitry. The circuitry is to be configured to exchange information with a TEE at a compute server to be coupled with the service server via a communication link routed through a fabric. The exchanged information is to authenticate the accelerator device to the TEE. The circuitry is also configured to receive a programming request from the TEE to program a key table for use to identify at least one session key to use to decrypt encrypted data sent from or destined to the TEE. The circuitry is also configured to program the key table based on the programming request and cause the key table to be stored to the memory.

Example 24. The accelerator device of example 23, the circuitry is also configured to receive a work request from the TEE to perform a transformation operation on data included in encrypted data. The circuitry is also configured to identify a session key to use to decrypt the encrypted data based on information included in the work request and based on the programmed key table. The circuitry is also configured to obtain the encrypted data and decrypt the encrypted data using the identified session key to generate clear text data. The circuitry is also configured to perform the transformation operation on the clear text data to generate transformed data. The circuitry is also configured to encrypt the transformed data using the session key to generate encrypted transformed data. The circuitry is also configured to cause the encrypted transformed data to be sent towards a destination indicated in the work request.

Example 25. The accelerator device of example 24, the destination indicated in the work request is a storage device coupled with the service server. The transformation operation can include compressing data included in the decrypted data, de-duplicating data included in the decrypted data or re-compressing data included in the decrypted data.

Example 26. The accelerator device of example 25, the transformation operation includes compressing data included in the decrypted data. The circuitry is also configured to generate a first cyclic redundancy check (CRC) value using the clear text data. The circuitry is also configured to compress the clear text data to generate the transformed data. The circuitry is also configured to encrypt the transformed data with the first CRC value. The circuitry is also configured to perform a reverse transform operation following encryption of the transformed data. The reverse transform operation is to include the circuitry to decrypt the encrypted transformed data with the first CRC value, decompress the decrypted transformed data to regenerate the clear text data, calculate a second CRC value using the regenerated clear text data, and compare the second CRC value with the first CRC value to determine if the regenerated clear text data is different than the clear text data that was compressed.

Example 27. The accelerator device of example 24, the destination indicated in work request is the TEE. The transformation operation includes decompressing data included in the decrypted data or de-duplicating data included in the decrypted data.

Example 28. The accelerator device of example 24, to identify the session key to use to decrypt the encrypted data based on information included in the work request includes the work request indicating a key table index value that is assigned to an entry in the programmed key table that includes the session key.

Example 29. The accelerator device of example 24, to identify the session key to use to decrypt the encrypted data based on information included in the work request includes the work request indicating a key table index value that is assigned to an entry in the programmed key table that includes a wrapping key. The work request to also include information for the circuitry to use the wrapping key to decrypt the session key that was encrypted using the wrapping key.

Example 30. The accelerator device of example 23, the circuitry also configured to receive a work request from the TEE to perform a transformation operation on data included in encrypted data. The circuitry is also configured to identify a first session key to use to decrypt the encrypted data based on information included in the work request and based on the programmed key table. The circuitry is also configured to obtain the encrypted data and decrypt the encrypted data using the identified first session key to generate clear text data. The circuitry is also configured to perform the transformation operation on the clear text data to generate transformed data. The circuitry is also configured to identify a second session key to use to encrypt the transformed data based on information included in the work request and based on the programmed key table. The circuitry is also configured to encrypt the transformed data using the second session key to generate encrypted transformed data. The circuitry is also configured to cause the encrypted transformed data to be sent towards a destination indicated in the work request.

Example 31. The accelerator device of example 23, the information exchanged with the TEE to authenticate the accelerator device is to establish a secure communication session with the accelerator device according to an SPDM specification.

Example 32. The accelerator device of example 23, the circuitry can be a core of a processor at the accelerator device, a field programmable gate array at the accelerator device, or an application specific integrated circuit at the accelerator device.

Example 33. An example method includes exchanging, by circuitry of an accelerator device coupled with a service server, information with a TEE at a compute server to be coupled with the service server via a communication link routed through a fabric, the exchanged information to authenticate the accelerator device to the TEE. The method also includes receiving, by circuitry of the accelerator device, a programming request from the TEE to program a key table for use to identify at least one session key to use to decrypt encrypted data sent from or destined to the TEE. The method also includes programming, by circuitry of the accelerator device, the key table based on the programming request and cause the key table to be stored to a memory at the accelerator device.

Example 34. The method of example 33 also includes receiving, by circuitry of the accelerator device, a work request from the TEE to perform a transformation operation on data included in encrypted data. The method also includes identifying, by circuitry of the accelerator device, a session key to use to decrypt the encrypted data based on information included in the work request and based on the programmed key table. The method also includes obtaining, by circuitry of the accelerator device, the encrypted data, decrypting the encrypted data using the identified session key to generate clear text data, and performing the transformation operation on the clear text data to generate transformed data. The method also includes encrypting, by circuitry of the accelerator device, the transformed data using the session key to generate encrypted transformed data and causing the encrypted transformed data to be sent towards a destination indicated in the work request.

Example 35. The method of example 34, the destination indicated in the work request is a storage device coupled with the service server. The transformation operation includes compressing data included in the decrypted data, de-duplicating data included in the decrypted data or re-compressing data included in the decrypted data.

Example 36. The method of example 35, the transformation operation include compressing data included in the decrypted data. The method also includes generating, by circuitry of the accelerator device, a first cyclic redundancy check (CRC) value using the clear text data. The method also includes compressing, by circuitry of the accelerator device, the clear text data to generate the transformed data. The method also includes encrypting, by circuitry of the accelerator device, the transformed data with the first CRC value. The method also includes performing, by circuitry of the accelerator device, a reverse transform operation following encryption of the transformed data. The reverse transform operation is to include decrypting the encrypted transformed data with the first CRC value, decompressing the decrypted transformed data to regenerate the clear text data, calculating a second CRC value using the regenerated clear text data, and comparing the second CRC value with the first CRC value to determine if the regenerated clear text data is different than the clear text data that was compressed.

Example 37. The method of example 34, the destination indicated in work request is the TEE. The transformation operation is to includes decompressing data included in the decrypted data or de-duplicating data included in the decrypted data.

Example 38. The method of example 34, identifying the session key to use to decrypt the encrypted data based on information included in the work request includes the work request indicating a key table index value that is assigned to an entry in the programmed key table that includes the session key.

Example 39. The method of example 34, identifying the session key to use to decrypt the encrypted data based on information included in the work request includes the work request indicating a key table index value that is assigned to an entry in the programmed key table that includes a wrapping key, the work request to also include information for the circuitry to use the wrapping key to decrypt the session key that was encrypted using the wrapping key.

Example 40. The method of example 33 may also include receiving, by the circuitry of the accelerator device, a work request from the TEE to perform a transformation operation on data included in encrypted data. The method also includes identifying, by circuitry of the accelerator device, a first session key to use to decrypt the encrypted data based on information included in the work request and based on the programmed key table. The method also includes obtaining, by circuitry of the accelerator device, the encrypted data and decrypt the encrypted data using the identified first session key to generate clear text data. The method also includes performing, by circuitry of the accelerator device, the transformation operation on the clear text data to generate transformed data. The method also includes identifying, by circuitry of the accelerator device, a second session key to use to encrypt the transformed data based on information included in the work request and based on the programmed key table. The method also includes encrypting, by circuitry of the accelerator device, the transformed data using the second session key to generate encrypted transformed data. The method also includes causing, by circuitry of the accelerator device, the encrypted transformed data to be sent towards a destination indicated in the work request.

Example 41. The method of example 33, the information exchanged with the TEE to authenticate the accelerator device is to establish a secure communication session with the accelerator device according to an SPDM specification.

Example 42. An example at least one machine readable medium includes a plurality of instructions that in response to being executed by circuitry of an accelerator device, cause the circuitry to carry out a method according to any one of examples 33 to 41.

Example 43. An example apparatus includes means for performing the methods of any one of examples 33 to 41.

Example 44. An example service server includes an accelerator device to include circuitry. The accelerator device circuitry is configured to exchange information with TEE at a compute server to be coupled with the service server via a communication link routed through a fabric. The exchanged information to authenticate the accelerator device to the TEE at the compute server. The accelerator device circuitry also be configured to securely share one or more session keys with the TEE at the compute server to use to decrypt encrypted data sent from or destined to the TEE at the compute server or to encrypt transformed data generated using decrypted encrypted data. The service server may also include a service TEE, the service TEE to include a trusted computing base that includes at least one core of a processor hosted by the service server and at least a portion of a memory hosted by the service server. The service TEE to include circuitry, the circuitry of the service TEE is configured to exchange information with a TEE at the compute server via the communication link routed through the fabric, the exchanged information to authenticate the service TEE to the TEE at the compute server. The circuitry of the service TEE also configured to securely share the one or more session keys with the TEE at the compute server to use to decrypt encrypted data sent from or destined to the TEE at the compute server or to encrypt transformed data generated by the accelerator device using decrypted encrypted data.

Example 45. The service server of example 44 also includes the circuitry of the service TEE further configured to receive a work request from the TEE for the accelerator device to perform a compression operation on data included in encrypted data and to store the compressed data at a storage device coupled with the service server. The circuitry of the service TEE also configured to identify a session key from among the one or more shared session keys to use to decrypt the encrypted data based on information included in the work request. The circuitry of the service TEE also configured to obtain the encrypted data and decrypt the encrypted data using the identified session key to generate clear text data. The circuitry of the service TEE also configured to provide the clear text data and the work request to the accelerator device. For this example the accelerator device circuitry is further configured to receive the work request and clear text data from the circuitry of the service TEE. The accelerator device circuitry is also configured to generate a first CRC value using the clear text data and compress the clear text data to generate compressed data. The accelerator device circuitry is also configured to identify the session key from among the one or more shared session keys to use to encrypt the compressed data and the first CRC value based on information included in the work request. The accelerator device circuitry is also configured to encrypt the compressed data and the first CRC value using the identified session key, and cause the encrypted compressed data and first CRC value to be sent to the storage device.

Example 46. The service server of example 45, prior to causing the encrypted compressed data and first CRC value to be sent to the storage device, the accelerator device circuitry is further configured to perform a reverse transform operation. The reverse transform operation to include the accelerator device circuitry to decrypt the encrypted compressed data and first CRC value, decompress the decrypted compressed data to regenerate the clear text data, calculate a second CRC value using the regenerated clear text data, and compare the second CRC value with the first CRC value to determine if the regenerated clear text data is different than the clear text data that was compressed.

Example 47. The service server of example 44 may also include the accelerator device circuitry of the service TEE further configured to receive a work request from the TEE for the accelerator device to perform a decompression operation on data included in encrypted data read from a storage device coupled with the service server. The accelerator device circuitry is also configured to identify a session key from among the one or more shared session keys to use to decrypt the encrypted data based on information included in the work request. The accelerator device circuitry is also configured to obtain the encrypted data and decrypt the encrypted data using the identified session key to generate compressed data and a first CRC value. The accelerator device circuitry is also configured to decompress the compressed data to generate clear text data, The accelerator device circuitry is also configured to calculate a second CRC value using the clear text data, compare the second CRC value with the first CRC value to determine if the second CRC value matches the first CRC value, and provide the clear text data and the work request to the service TEE. For this example, the circuitry of the service TEE is further configured to receive the work request and clear text data from the accelerator device circuitry, identify the session key from among the one or more shared session keys to use to encrypt the clear text data based on information included in the work request, encrypt the clear text data using the identified session key, and cause the encrypted clear text data to be sent to the TEE at the compute server.

Example 48. The service server of example 44, wherein the information exchanged to authenticate the accelerator device to the TEE at the compute server is to establish a first secure communication session with the accelerator device according to an SPDM specification and the information exchanged to authenticate the service TEE to the TEE at the compute server is to establish a second secure communication session with the service TEE according to the SPDM specification.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

While various examples described herein could use the System-on-a-Chip or System-on-Chip ("SoC") to describe a device or system having a processor and associated circuitry (e.g., Input/Output ("I/O") circuitry, power delivery circuitry, memory circuitry, etc.) integrated monolithically into a single integrated circuit ("IC") die, or chip, the present disclosure is not limited in that respect. For example, in various examples of the present disclosure, a device or system could have one or more processors (e.g., one or more processor cores) and associated circuitry (e.g., Input/Output ("I/O") circuitry, power delivery circuitry, etc.) arranged in a disaggregated collection of discrete dies, tiles and/or chiplets (e.g., one or more discrete processor core die arranged adjacent to one or more other die such as memory die, I/O die, etc.). In such disaggregated devices and systems the various dies, tiles and/or chiplets could be physically and electrically coupled together by a package structure including, for example, various packaging substrates, interposers, interconnect bridges and the like. Also, these disaggregated devices can be referred to as a system-on-a-package (SoP).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus to be configured at a compute server, the apparatus comprising:

a processor;

a memory; and circuitry of a trusted execution environment (TEE), the TEE to include a trusted computing base that includes at least one core of the processor and at least a portion of the memory, wherein the circuitry is configured to:

authenticate an accelerator at a service server that is to be coupled with the compute server via a communication link routed through a fabric; and cause a key table to be programmed and maintained at the accelerator, the key table for use by the accelerator to identify at least one session key to use to decrypt encrypted data sent from or destined to the TEE, wherein the key table is to be programmed based on a session key programming request to configure each entry in the key table associated with an indicated key index value as a positive integer value (>=2), which is to be used to decrypt and encrypt data associated with an active communication session of a given established secure session.

2. The apparatus of claim 1, further comprising the circuitry configured to:

generate a work request for the accelerator to perform a transformation operation on data included in encrypted data, the work request to include information for the accelerator to identify a session key to use to decrypt the encrypted data based on the programmed key table, the work request to indicate that transformed data is to be encrypted using the session key and sent towards a destination indicated in the work request; and cause the work request to be sent to the accelerator.

3. The apparatus of claim 2, the destination indicated in the work request comprises a storage device coupled with the service server, wherein the transformation operation includes compressing data included in the decrypted data, de-duplicating data included in the decrypted data or re-compressing data included in the decrypted data.

4. The apparatus of claim 3, the transformation operation includes compressing data included in the decrypted data, wherein the decrypted data includes one or more data-blocks, each data-block having a hash value generated by the circuitry, respective generated hash values to be used to verify an integrity of each data-block.

5. The apparatus of claim 2, the destination indicated in the work request comprises the TEE, wherein the transformation operation includes decompressing data included in the decrypted data or de-duplicating data included in the decrypted data.

6. The apparatus of claim 5, the transformation operation includes decompressing data included in the decrypted data, wherein the decrypted data includes one or more data-blocks, each data-block having a hash value generated by the circuitry, respective generated hash values to be used to verify an integrity of each data-block.

7. The apparatus of claim 1, wherein the circuitry is configured to authenticate the accelerator via establishment of a secure communication session with the accelerator according to a Secure Protocol and Data Model (SPDM) specification.

8. The apparatus of claim 1, wherein the circuitry of the TEE comprises a core of the processor, a field programmable gate array, or an application specific integrated circuit.

9. A method comprising:

authenticating, by circuitry of a trusted execution environment (TEE) at a compute server, an accelerator at a service server that is to be coupled with the compute server via a communication link routed through a fabric; and causing a key table to be programmed and maintained at the accelerator, the key table for use by the accelerator to identify at least one session key to use to decrypt encrypted data sent from or destined to the TEE, wherein the key table is programmed based on a session key programming request to configure each entry in the key table associated with an indicated key index value as a positive integer value (>=2), which is to be used to decrypt and encrypt data associated with an active communication session of a given established secure session.

10. The method of claim 9, further comprising:

generating a work request for the accelerator to perform a transformation operation on data included in encrypted data, the work request to include information for the accelerator to identify a session key to use to decrypt the encrypted data based on the programmed key table, the work request to indicate that transformed data is to be encrypted using the session key and sent towards a destination indicated in the work request; and causing the work request to be sent to the accelerator.

11. The method of claim 10, the destination indicated in the work request comprises a storage device coupled with the service server, wherein the transformation operation includes compressing data included in the decrypted data, de-duplicating data included in the decrypted data or re-compressing data included in the decrypted data.

12. The method of claim 11, the transformation operation includes compressing data included in the decrypted data, wherein the decrypted data includes one or more data-blocks, each data-block having a hash value generated by the circuitry of the TEE, respective generated hash values to be used to verify an integrity of each data-block.

13. The method of claim 10, the destination indicated in work request comprises the TEE, wherein the transformation operation includes decompressing data included in the decrypted data or de-duplicating data included in the decrypted data.

14. The method of claim 13, the transformation operation includes decompressing data included in the decrypted data, wherein the decrypted data includes one or more data-blocks, each data-block having a hash value generated by the circuitry of the TEE, respective generated hash values to be used to verify an integrity of each data-block.

15. At least one non-transitory computer-readable storage medium, comprising a plurality of instructions, that when executed by circuitry of a trusted execution environment (TEE) at a compute server, cause the circuitry to:

authenticate an accelerator at a service server that is to be coupled with the compute server via a communication link routed through a fabric; and cause a key table to be programmed and maintained at the accelerator, the key table for use by the accelerator to identify at least one session key to use to decrypt encrypted data sent from or destined to the TEE, wherein the key table is to be programmed based on a session key programming request to configure each entry in the key table ated with an indicated key index value as a positive integer value (>=2), which is used to decrypt and encrypt data associated with an active communication session of a given established secure session.

16. The at least one non-transitory computer-readable storage medium of claim 15, the instructions to further cause the circuitry to:

generate a work request for the accelerator to perform a transformation operation on data included in encrypted data, the work request to include information for the accelerator to identify a session key to use to decrypt the encrypted data based on the programmed key table, the work request to indicate that transformed data is to be encrypted using the session key and sent towards a destination indicated in the work request; and cause the work request to be sent to the accelerator.

17. The at least one non-transitory computer-readable storage medium of claim 16, the destination indicated in the work request comprises a storage device coupled with the service server, wherein the transformation operation includes compressing data included in the decrypted data, de-duplicating data included in the decrypted data or re-compressing data included in the decrypted data.

18. The at least one non-transitory computer-readable storage medium of claim 16, the destination indicated in work request comprises the TEE, wherein the transformation operation includes decompressing data included in the decrypted data or de-duplicating data included in the decrypted data.

19. An accelerator device configured to be coupled with a service server, the accelerator device comprising:

a memory; and circuitry to be configured to: exchange information with a trusted execution environment (TEE) at a compute server to be coupled with the service server via a communication link routed through a fabric, the exchanged information to authenticate the accelerator device to the TEE; and receive a session key programming request from the TEE to program a key table for use to identify at least one session key to use to decrypt encrypted data sent from or destined to the TEE; and program the key table based on the session key programming request and cause the key table to be stored to the memory, wherein each entry of the key table is associated with an indicated key index value as a positive integer value (>=2), which is to be used to decrypt and encrypt data associated with an active communication session of a given established secure session.

20. The accelerator device of claim 19, further comprising the circuitry configured to:

receive a work request from the TEE to perform a transformation operation on data included in encrypted data;

identify a session key to use to decrypt the encrypted data based on information included in the work request and based on the programmed key table;

obtain the encrypted data and decrypt the encrypted data using the identified session key to generate clear text data;

perform the transformation operation on the clear text data to generate transformed data;

encrypt the transformed data using the session key to generate encrypted transformed data; and cause the encrypted transformed data to be sent towards a destination indicated in the work request.

21. The accelerator device of claim 20, the destination indicated in the work request comprises a storage device coupled with the service server, wherein the transformation operation includes compressing data included in the decrypted data, de-duplicating data included in the decrypted data or re-compressing data included in the decrypted data.

22. The accelerator device of claim 21, wherein the transformation operation comprises compressing data included in the decrypted data, and wherein the circuitry is further configured to:

generate a first cyclic redundancy check (CRC) value using the clear text data;

compress the clear text data to generate the transformed data;

encrypt the transformed data with the first CRC value; and perform a reverse transform operation following encryption of the transformed data, the reverse transform operation to include the circuitry to:

decrypt the encrypted transformed data with the first CRC value, decompress the decrypted transformed data to regenerate the clear text data, calculate a second CRC value using the regenerated clear text data, and compare the second CRC value with the first CRC value to determine if the regenerated clear text data is different than the clear text data that was compressed.

23. The accelerator device of claim 20, the destination indicated in work request comprises the TEE, wherein the transformation operation includes decompressing data included in the decrypted data or de-duplicating data included in the decrypted data.

24. The accelerator device of claim 20, wherein to identify the session key to use to decrypt the encrypted data based on information included in the work request comprises the work request indicating a key table index value that is assigned to an entry in the programmed key table that includes the session key.

25. The accelerator device of claim 20, wherein to identify the session key to use to decrypt the encrypted data based on information included in the work request comprises the work request indicating a key table index value that is assigned to an entry in the programmed key table that includes a wrapping key, the work request to also include information for the circuitry to use the wrapping key to decrypt the session key that was encrypted using the wrapping key.

26. The accelerator device of claim 19, further comprising the circuitry configured to:

receive a work request from the TEE to perform a transformation operation on data included in encrypted data;

identify a first session key to use to decrypt the encrypted data based on information included in the work request and based on the programmed key table;

obtain the encrypted data and decrypt the encrypted data using the identified first session key to generate clear text data;

perform the transformation operation on the clear text data to generate transformed data;

identify a second session key to use to encrypt the transformed data based on information included in the work request and based on the programmed key table;

encrypt the transformed data using the second session key to generate encrypted transformed data; and cause the encrypted transformed data to be sent towards a destination indicated in the work request.

27. A service server comprising:

an accelerator device to include circuitry configured to:

exchange information with trusted execution environment (TEE) at a compute server to be coupled with the service server via a communication link routed through a fabric, the exchanged information to authenticate the accelerator device to the TEE at the compute server; and securely share one or more session keys with the TEE at the compute server to use to decrypt encrypted data sent from or destined to the TEE at the compute server or to encrypt transformed data generated using decrypted encrypted data; and a service TEE, the service TEE to include a trusted computing base that includes at least one core of a processor hosted by the service server and at least a portion of a memory hosted by the service server, wherein the service TEE includes circuitry, the circuitry of the service TEE is configured to:

exchange information with a TEE at the compute server via the communication link routed through the fabric, the exchanged information to authenticate the service TEE to the TEE at the compute server; and securely share the one or more session keys based on a key table, with the TEE at the compute server to use to decrypt encrypted data sent from or destined to the TEE at the compute server or to encrypt transformed data generated by the accelerator device using decrypted encrypted data, wherein the key table is to be programmed based on a session key programming request to configure each entry in the key table associated with an indicated key index value as a positive integer value (>=2), which is to be used to decrypt and encrypt data associated with an active communication session of a given established secure session.

28. The service server of claim 27, further comprising:

the circuitry of the service TEE further configured to receive a work request from the TEE for the accelerator device to perform a compression operation on data included in encrypted data and to store the compressed data at a storage device coupled with the service server, identify a session key from among the one or more shared session keys to use to decrypt the encrypted data based on information included in the work request, and obtain the encrypted data and decrypt the encrypted data using the identified session key to generate clear text data, and provide the clear text data and the work request to the accelerator device; and the accelerator device circuitry further configured to receive the work request and clear text data from the circuitry of the service TEE, generate a first cyclic redundancy check (CRC) value using the clear text data, compress the clear text data to generate compressed data;

identify the session key from among the one or more shared session keys to use to encrypt the compressed data and the first CRC value based on information included in the work request, encrypt the compressed data and the first CRC value using the identified session key, and cause the encrypted compressed data and first CRC value to be sent to the storage device.

29. The service server of claim 28, wherein prior to causing the encrypted compressed data and first CRC value to be sent to the storage device, the accelerator device circuitry further configured to perform a reverse transform operation to include the accelerator device circuitry to:

decrypt the encrypted compressed data and first CRC value;

decompress the decrypted compressed data to regenerate the clear text data;

calculate a second CRC value using the regenerated clear text data; and compare the second CRC value with the first CRC value to determine if the regenerated clear text data is different than the clear text data that was compressed.

30. The service server of claim 27, further comprising:

the accelerator device circuitry of the service TEE further configured to receive a work request from the TEE for the accelerator device to perform a decompression operation on data included in encrypted data read from a storage device coupled with the service server, identify a session key from among the one or more shared session keys to use to decrypt the encrypted data based on information included in the work request; and obtain the encrypted data and decrypt the encrypted data using the identified session key to generate compressed data and a first cyclic redundancy check (CRC) value, decompress the compressed data to generate clear text data, calculate a second CRC value using the clear text data, compare the second CRC value with the first CRC value to determine if the second CRC value matches the first CRC value, and provide the clear text data and the work request to the service TEE; and the circuitry of the service TEE further configured to receive the work request and clear text data from the accelerator device circuitry, identify the session key from among the one or more shared session keys to use to encrypt the clear text data based on information included in the work request, encrypt the clear text data using the identified session key, and cause the encrypted clear text data to be sent to the TEE at the compute server.

31. The service server of claim 27, wherein the information exchanged to authenticate the accelerator device to the TEE at the compute server is to establish a first secure communication session with the accelerator device according to a Secure Protocol and Data Model (SPDM) specification and the information exchanged to authenticate the service TEE to the TEE at the compute server is to establish a second secure communication session with the service TEE according to the SPDM specification.

* * * * *